(12) United States Patent
Genossar et al.

(10) Patent No.: US 9,338,032 B2
(45) Date of Patent: May 10, 2016

(54) DEVICE AND METHOD FOR CHANNEL ESTIMATION AND SIGNAL DEMODULATION

(71) Applicants: Michael Genossar, Modiin (IL); Yaniv Kaver, Givatayim (IL); Vladimir Kravtsov, Jerusalem (IL); Uriel Lemberger, Mitzpe Aviv (IL)

(72) Inventors: Michael Genossar, Modiin (IL); Yaniv Kaver, Givatayim (IL); Vladimir Kravtsov, Jerusalem (IL); Uriel Lemberger, Mitzpe Aviv (IL)

(73) Assignee: Intel IP Corporation, Santa Clara, CA (US)

( * ) Notice: Subject to any disclaimer, the term of this patent is extended or adjusted under 35 U.S.C. 154(b) by 37 days.

(21) Appl. No.: 14/093,769

(22) Filed: Dec. 2, 2013

(65) Prior Publication Data

US 2015/0156036 A1    Jun. 4, 2015

(51) Int. Cl.
*H04L 27/06* (2006.01)
*H04L 25/02* (2006.01)
*H04L 25/03* (2006.01)
*H04L 27/00* (2006.01)

(52) U.S. Cl.
CPC ...... *H04L 25/0202* (2013.01); *H04L 25/03038* (2013.01); *H04L 25/0224* (2013.01); *H04L 2027/0042* (2013.01)

(58) Field of Classification Search
CPC .. H04B 1/1027; H04L 27/0014; H04L 27/38; H04L 2027/0042; H04L 25/0202; H04L 25/0224; H04L 25/03038
USPC .......................................... 375/316, 324, 340
See application file for complete search history.

(56) References Cited

U.S. PATENT DOCUMENTS

| | | | | |
|---|---|---|---|---|
| 6,628,730 | B1 * | 9/2003 | Stott et al. | 375/344 |
| 6,647,071 | B2 * | 11/2003 | Sommer et al. | 375/285 |
| 2006/0251198 | A1 * | 11/2006 | Ma et al. | 375/350 |
| 2009/0285086 | A1 * | 11/2009 | Adachi | 370/210 |
| 2011/0129041 | A1 * | 6/2011 | Ishihara et al. | 375/340 |
| 2015/0098535 | A1 * | 4/2015 | Wu et al. | 375/350 |

OTHER PUBLICATIONS

IEEE P802.11ad/D9.0, Part 11,"Draft Standard for Information Technology—Telecommunications and Information Exchange Between Systems—Local and Metropolitan Area Networks—Specific Requirements", Part 11, Amendment 3, IEEE, Jul. 2012.

* cited by examiner

*Primary Examiner* — Freshteh N Aghdam
(74) *Attorney, Agent, or Firm* — Schiff Hardin LLP

(57) ABSTRACT

A device includes an input configured to receive a signal, wherein the signal includes at least one data block and a plurality of signal parts known to the device, a first signal part at the beginning of the data block and a second signal part at the end of the data block. The device further includes an equalizer and a pre-equalizer coupled between the input and the equalizer, wherein the pre-equalizer is configured to estimate a phase shift between the plurality of signal parts.

18 Claims, 12 Drawing Sheets

DEVICE AND METHOD FOR CHANNEL ESTIMATION AND SIGNAL DEMODULATION

TECHNICAL FIELD

Examples described herein generally relate to devices and more specifically to communication devices including an equalizer. Examples described herein further relate to methods for estimating a propagation channel. Further examples relate to methods for demodulating a signal that has passed a propagation channel.

BACKGROUND

Propagation channels may degrade a signal in various ways. To be able to recover transmitted information, the propagation channel may be estimated. Good channel estimation may enhance the possibilities to properly demodulate the signal and may increase the quantity of information which may be transmitted by a signal by using, for example, a more sophisticated modulation method.

In Wireless Local Area Network (WLAN) applications a radio signal may be transmitted over rather short communication distances. A 60 GHz WLAN system is currently studied by a task force of the Institute of Electrical and Electronics Engineers. A specification draft IEEE 802.11 ad is aimed at an indoor system with distances from under 1 m to several meters.

BRIEF DESCRIPTION OF THE DRAWINGS

The accompanying drawings are included to provide a further understanding of examples and are incorporated in and constitute a part of this specification. The drawings illustrate exemplary examples and together with the description serve to explain principles. Other examples and many of the intended advantages of examples will be readily appreciated as they become better understood by reference to the following detailed description.

DESCRIPTION

Figure 1:
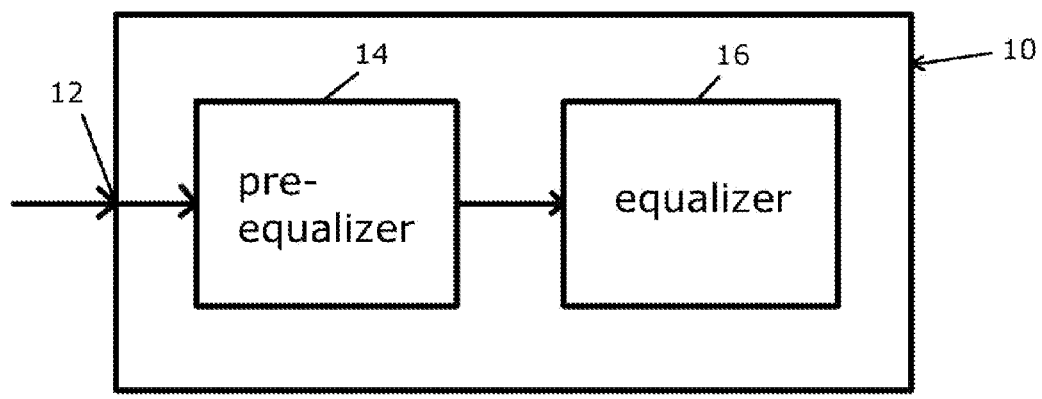
FIG. 1 shows a simplified block diagram of an exemplary device including a pre-equalizer.

In the following, examples are described with reference to the drawings wherein like reference numerals are generally utilized to refer to like elements throughout. In the following description, for purposes of explanation, numerous specific details are set forth in order to provide a thorough understanding of one or more aspects. However, it may be evident to a person skilled in the art that one or more aspects may be practiced with a lesser degree of these specific details. The following description is therefore not to be taken in a limiting sense, and the scope of protection is defined by the appended claims.

The various aspects summarized may be embodied in various forms. The following description shows by way of illustration various combinations and configurations in which the aspects may be practiced. It is understood that the described aspects and/or examples are merely examples and that other aspects and/or examples may be utilized and structural and functional modifications may be made without departing from the scope of the present disclosure. In addition, while a particular feature or aspect of an example may be disclosed with respect to only one of several implementations, such feature or aspect may be combined with one or more other features or aspects of the other implementations as it may be desired and advantageous for any given or particular application.

Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal. As employed in this specification, the terms "coupled" or "connected" are not meant to mean that elements must be directly coupled or connected together. Intervening elements may be provided between the "coupled" or "connected" elements. For electrical components as for example capacitors, resistors and operational amplifiers "coupled" means "electrically coupled".

Some examples described herein may relate more specifically to devices and to radio receivers receiving single-carrier (SC) signals. In described examples devices may include Frequency Domain Equalizer (FDE). Some examples described herein may further relate to methods for carrier recovery (CR) during estimation of a signal propagation channel. Further examples may relate to methods for carrier recovery during a signal demodulation.

A radio-transmitter (Tx) may generally convert a digital base-band (BB) signal to an analog domain. A radio-transmitter may then up-convert the analog signal to a higher frequency for example to RF with frequencies in the GHz domain. A radio-transmitter may then emit the RF signal into a radio propagation channel. A radio-receiver (Rx) may receive the transmitted signal and may amplify the RF signal. A radio-receiver may then down-convert the amplified RF signal to base-band.

A radio-receiver may then sample/quantize the base band signal to digital domain and may equalize it. Equalizing may reverse at least partly a channel distortion experienced during transmission in the propagation channel. Operation of a radio receiver is not necessarily ideal: the amplification may be accompanied by an additive error due to thermal noise, the down-conversion may be accompanied by a multiplicative error due to a ratio which is not "1" but is stochastically varying, between instantaneous carrier frequency of the radio-transmitter and instantaneous carrier frequency of the radio receiver. The multiplicative error may have a constant magnitude and a slowly varying phase. A phase of the multiplicative error or in other words a phase error may include a stochastic component called phase noise (PN) and a linear component. The linear component of the phase error may have a slope equal to a frequency offset between the carrier frequencies of transmitter and receiver. A radio-receiver may estimate the phase error and correct, in particular derotate, the digital signal by the estimate. This process can be called carrier recovery (CR).

It is to be understood that radio-receiver or more generally the device which may be not a radio receiver may only estimate the phase error and carrier recovery may be imperfect. The remaining not corrected phase error may degrade sensitivity of the radio receiver. The degradation may limit the so called order of modulation the radio-receiver is capable of.

A radio signal which has a bandwidth greater than 1 GHz may be called an ultra-wide band (UWB) signal. Digital processing of an ultra-wide band signal has to be very fast. Equalization of a single carrier UWB signal may be done using a frequency domain equalizer (FDE), which may provide a very fast and effective processing, but may require a specific signal structure. To enable FDE and to enhance the reception quality, the transmitter signal may contain pre-known parts, also called "pilot" parts, especially in cases where the phase noise may be high, and where a signal-to-noise ratio (SNR) may be low. Pre-known parts may be included in the following signal fields:

Preamble fields that may support signal amplification and frequency offset estimation;

Channel Estimation (CE) fields that may provide coefficients for FDE;

Pilots which may form the CE field whereby a pilot may be a fixed sequence multiplied by pre-known coefficient. Additionally, pilot parts that may enable carrier recovery during channel estimation;

Pilot parts inside a data field which may also be called guard interval (GI). Guard intervals may split a data field into data blocks. A data block may be defined to be located between the middles of two consecutive guard intervals. GIs may be equal one to another to enable FDE. Additionally, guard intervals may enable carrier recovery during reception of a data field. Guard intervals may be or may not be the same as at least one of the pilots which form the CE field.

In a single carrier demodulator which uses a frequency domain equalizer, the phase error may influence signal demodulation in different ways. A phase error being different at edges of a data block may degrade frequency domain equalization. A phase error variation inside a CE field may distort FDE coefficients. After equalization phase error may be small at GIs but may be big at inner parts of the equalized blocks. Examples disclosed herein decrease the above described influence of the phase error.

FIG. 1 shows a device 10 that may include an input 12. FIG. 1 shows only some parts of device 10 in a very simplified manner. Device 10 may be part of a receiver and more especially a radio receiver. Device 10 may be part of a demodulator. The device 10 may include a pre-equalizer 14 and an equalizer 16. The input 12 may be coupled to an antenna to receive a radio signal transmitted via a propagation channel. The propagation channel may degrade the transmitted signal quality. The input 12 may be coupled to a digital front end to receive a digital signal. The digital signal may be a digital base band signal.

High frequency systems with frequencies over about 30 to 40 GHz carrier frequency may experience severe degradations. In that frequency range typical frequency synthesizers in transmitter and receiver may create phase noise. Furthermore, the phase noise in these systems may be rather high and fast changing. The WiGig (Wireless Gigabit) system or the WLAN system as specified under IEEE 802.11 ad are exemplary systems using a carrier frequency of about 60 GHz. The WLAN system as specified under IEEE 802.11 ad may be a system aiming for a cheap indoor, mm-wave, UWB, Single Carrier radio. In such system, phase noise may be strong, SNR may be low and FDE may be necessary. The specification draft (IEEE 802.11 ad) defines a proper signal structure. Other systems are under study as well. The China Wireless Personal Area Network (CWPAN) presently under study uses a carrier frequency included between 43 and 47 GHz. The phase noise and especially the fast changing phase noise may degrade the channel estimation and may hinder a fault-free signal demodulation In the device 10, the pre-equalizer 14 may be coupled between the input 12 and the equalizer 16. It is to be understood that further receiver components may be arranged between the input 12 and the pre-equalizer 14. For example, a digital receiver front end may be arranged between the input 12 and the pre-equalizer 14. It is also to be understood that further receiver components may be arranged between the pre-equalizer 14 and the equalizer 16. The pre-equalizer 14 may be adapted to estimate a phase shift of a received signal. The phase shift may be between two specific signal parts. A first signal part may arrive at the pre-equalizer 14 with a first phase error and a second signal part may arrive at the pre-equalizer 14 with a second phase error. The phase shift is then the difference between the two phase errors. The pre-equalizer 14 may be adapted to estimate a phase shift of a received signal transformed to a base band signal.

The device 10 may receive a signal which may include a data field structured into data blocks. The phase estimator 14 may estimate a phase shift for each data block. The pre-equalizer 14 may be adapted to estimate the phase shift by utilizing two signal parts known to device 10 as for example GI signals. One signal part may be arranged at the beginning of the data block and one signal part may be arranged at the end of the data block. The data block may then be phase corrected and may then be fed to the equalizer 16. The phase shift may be due to phase noise. An advantage of estimating the phase shift and correcting it before feeding the data block to the equalizer 16 may be that it avoids degradation of the frequency domain equalization.

The pre-equalizer 14 may be adapted to correct, in particular derotate, the data block according to the detected phase shift. Derotating means that the phase shift is corrected or at least the phase shift is decreased. The phase shift may be estimated using the two known signal parts and phase correction may be effectuated on the data block between the known signal parts. The pre-equalizer 14 may feed the corrected (or derotated) data block to the equalizer 16. The data block may be derotated by a continuous phasor whose phase increment along the block is equal to the phase shift estimate.

Figure 2:
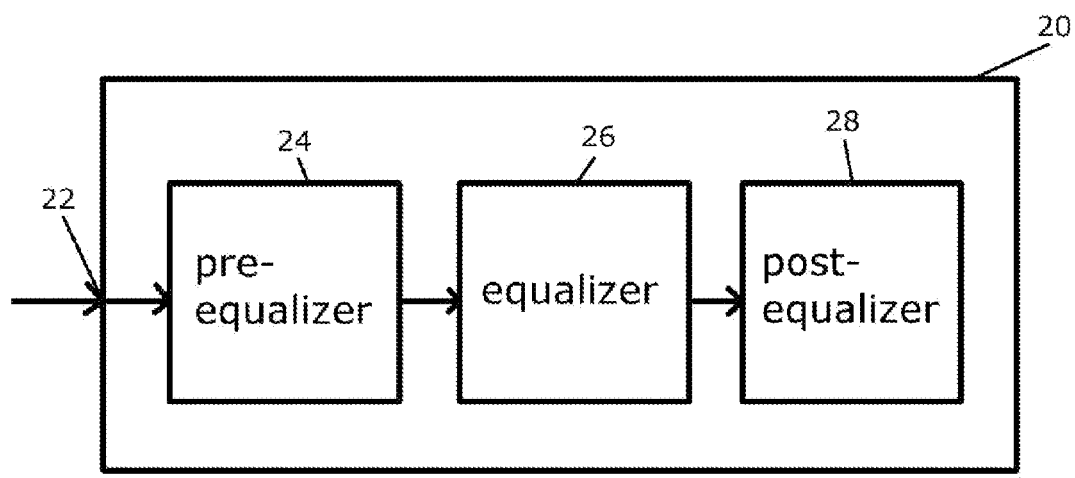
FIG. 2 shows a simplified block diagram of another exemplary device including a pre-equalizer and a post-equalizer.

FIG. 2 shows a device 20 which may include an input 22. The device 20 may include a pre-equalizer 24, an equalizer 26 and a post-equalizer 28. FIG. 2 shows a qualitative example not including necessarily all components. The input 22 may be coupled to an antenna to receive a radio signal transmitted via a propagation channel. The input 22 may also be coupled to a digital front-end to receive a digital baseband signal. The input 22, the pre-equalizer 24 and the equalizer 26 of the device 20 may be the same or similar to the input 12, the pre-equalizer 14 and the equalizer 16 of the device 10.

The input 22 may be coupled to pre-equalizer 24. The pre-equalizer 24 may be coupled to an input of the equalizer 26. The post-equalizer 28 may be coupled to an output of the equalizer 26. In other words, the equalizer 26 may be coupled between the pre-equalizer 24 and the post-equalizer 28. A single carrier signal may be transmitted over a propagation or transmission channel as a radio signal and may be received at the input 22. In the receiver 20 a digital receiver front end, which is not shown in FIG. 2, may sample the radio signal. The sampled single carrier signal may then be applied to the pre-equalizer 24. The pre-equalizer 24 may be adapted to estimate a phase shift of the received signal and may correct for it. The signal may be equalized in the equalizer 26. The post-equalizer 28 may be adapted to estimate a phase error of the equalized signal and correct for it.

The device 20 may be a receiver used in a wireless local area network. The WLAN may be a Gigahertz WLAN with a carrier frequency above 30 GHz. Further, the WLAN may be a Gigahertz WLAN with a carrier frequency of about 60 GHz. The receiver 20 may be a receiver adapted to work in a WLAN according to IEEE 802.11 ad.

For clarity reasons the term "phase shift" is used here to designate the phase difference, estimated in the pre-equalizer, between two specific signal parts. The term "post equalizer phase error" is used here to designate the phase error value estimated in the post-equalizer.

Figure 3:
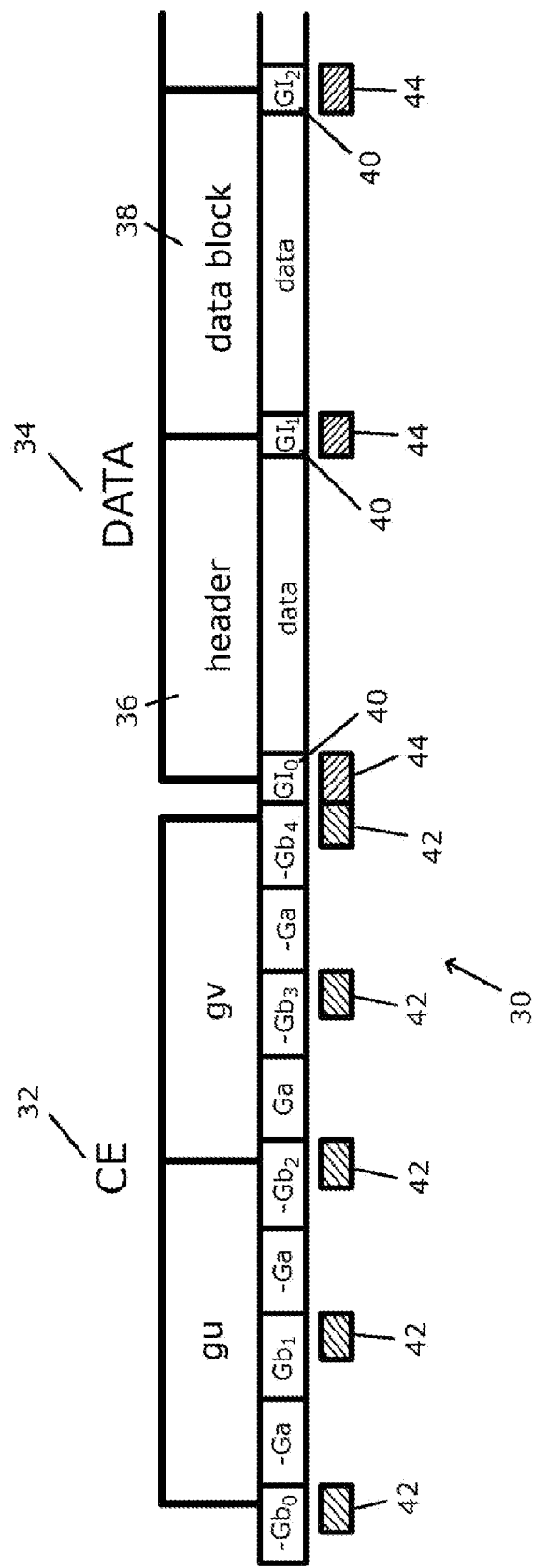
FIG. 3 shows a possible structure of a signal received by a device in accordance with the disclosure.

FIG. 3 shows a possible structure 30 of the signal received by either the device 10 or the device 20. Signal structure 30 may be a signal structure as proposed by the IEEE 802.11 ad draft. Only the signal structure necessary to understand the present examples is shown. It is understood that the complete signal structure may further include a so-called short training field. The signal structure 30 as shown in FIG. 3 may include a channel estimation field CE 32 and a data field 34. The channel estimation field CE 32 may include two channel estimation blocks or channel estimation sub-fields gu and gv, The channel estimation subfields gu and gv may be used to estimate a channel response.

The blocks gu and gv may be composed of Golay sequences Ga and Gb with varying plus and minus signs. In the illustrated example, there are nine Golay sequences. Another number of Golay sequences is also possible. A channel estimation field including Golay sequences is, for example, included in the actual draft of IEEE 802.11 ad.

The data field 34 may include a header 36 and data blocks, wherein only one data block 38 is shown in FIG. 3. A data block 38 may have the same length as a channel estimation block gu or gv. Although only one data block 38 is shown, a number of data blocks 38 allowing transmission of a payload may be included in the signal structure. The signal structure may also include more than one header. The data blocks 38 may include parts of guard intervals 40. Thus, data may be separated by guard intervals GI 40. The GIs 40 may be known to the device.

The pre-equalizer 14, 24 may use at least a part of the Gb sequences for evaluating a phase shift. In FIG. 3 hatched boxes 42 indicate parts of the Gb sequences which may be used in pre-equalizers. The Golay sequence Gb0 may be at a beginning of the channel estimation block gu. The Golay sequence Gb2 may be at an end of the channel estimation block gu. The Golay sequence Gb2 may also be at a beginning of the channel estimation block gv. The Golay sequence Gb4 may be at an end of the channel estimation block gv. Using equivalent sequences at the beginning and end of a channel estimation block, may enable performing frequency domain correlation.

The Golay sequence Gb1 may be at an end of a first half of the channel estimation block gu and at a beginning of a second half of the channel estimation block gu. The Golay sequence Gb2 may be at an end of the second half of the channel estimation block gu. The Golay sequences which are already present in the signal structure may be used to reduce problems due to phase noise.

The data blocks 38 and also the header 36 or the headers may be of equal length. They may be modulated using a quadrature amplitude modulation QAM of some order. For example, pi/2 QAM2, QAM2, QAM4, QAM16 or QAM64 may be used, QAM16 having 16 constellation points and QAM64 having 64 constellation points. Due to the greater number of constellation points, QAM64 may be more sensitive to phase noise. Other modulations may be used as well. The modulation order of the header block 36 may be lower than that of the following data blocks.

The guard intervals 40 may be introduced into signal structures to provide immunity against transmission problems as delays, multipath etc. The guard intervals 40 may be composed of signal parts known to the device. The guard interval GI1 may be at a beginning of the data block 38. The guard interval GI2 may be at an end of the data block 38. The guard intervals 40 may be composed of Golay sequences. In FIG. 3 hatched boxes 44 indicate that the guard intervals GI may be used in the pre-equalizers 14, 24, or in other words, hatched boxes 44 indicate that GIs may be used as pilots.

A so-called data block or header may include a guard interval and a data section. A data block or header may include M QAM-symbols in total. M may be 512, 64 symbols or QAM-symbols of the 512 symbols may be attributed to the guard interval GI and 448 symbols or QAM-symbols may be attributed to the data section. CE blocks and data blocks may be assigned the following serial numbers: gu=block[−2], gv=block[−1], header=block[0], and so on.

The pre-equalizer 14, 24 may estimate a phase shift between at least two known signal parts which may be included in the received signal. The known signal parts may be some of the Golay sequences. In the example of FIG. 3, these may be the Golay sequences Gb for the channel estimation field. The known signal parts may be the guard intervals GI 40 in the data field 34. It is understood that the pre-equalizers 14, 24 may estimate a phase shift between two known signal parts. The two known signal parts may be at a beginning and at an end of a whole block or at a beginning of a block and at the end of a fraction of a block. The estimated phase shift may then be used for the whole block or for the fraction of the block included between the two known signal parts.

At transmitter side, CE pilots Gb may be pre-known and equal one to another. At transmitter side, GIs may be pre-known and equal one to another. However, in the signals received at the receiver side before the frequency domain equalizer, the pilots may be distorted by the channel, so they may be not known at that point. If some transmitter pilots are the same, then the correspondent received pilots are also the same, with the difference that there may be additive noise and a phase error difference. Hence, if two consecutive transmitter pilots are the same, the angle between the correspondent received pilots may be a good estimate for a phase shift between (middles of) those two pilots. This estimation may be applicable to both CE-pilots and GIs.

In contrast to CE-pilots, GIs may be equalized together with data. An equalized GI may be the same as a transmitted GI, which is pre-known, up to the additive noise, inter-symbol interference and phase error residue. Hence, the angle between the equalized GI and the pre-known transmitted GI may be a good estimate of a post equalizer phase error.

Figure 4:
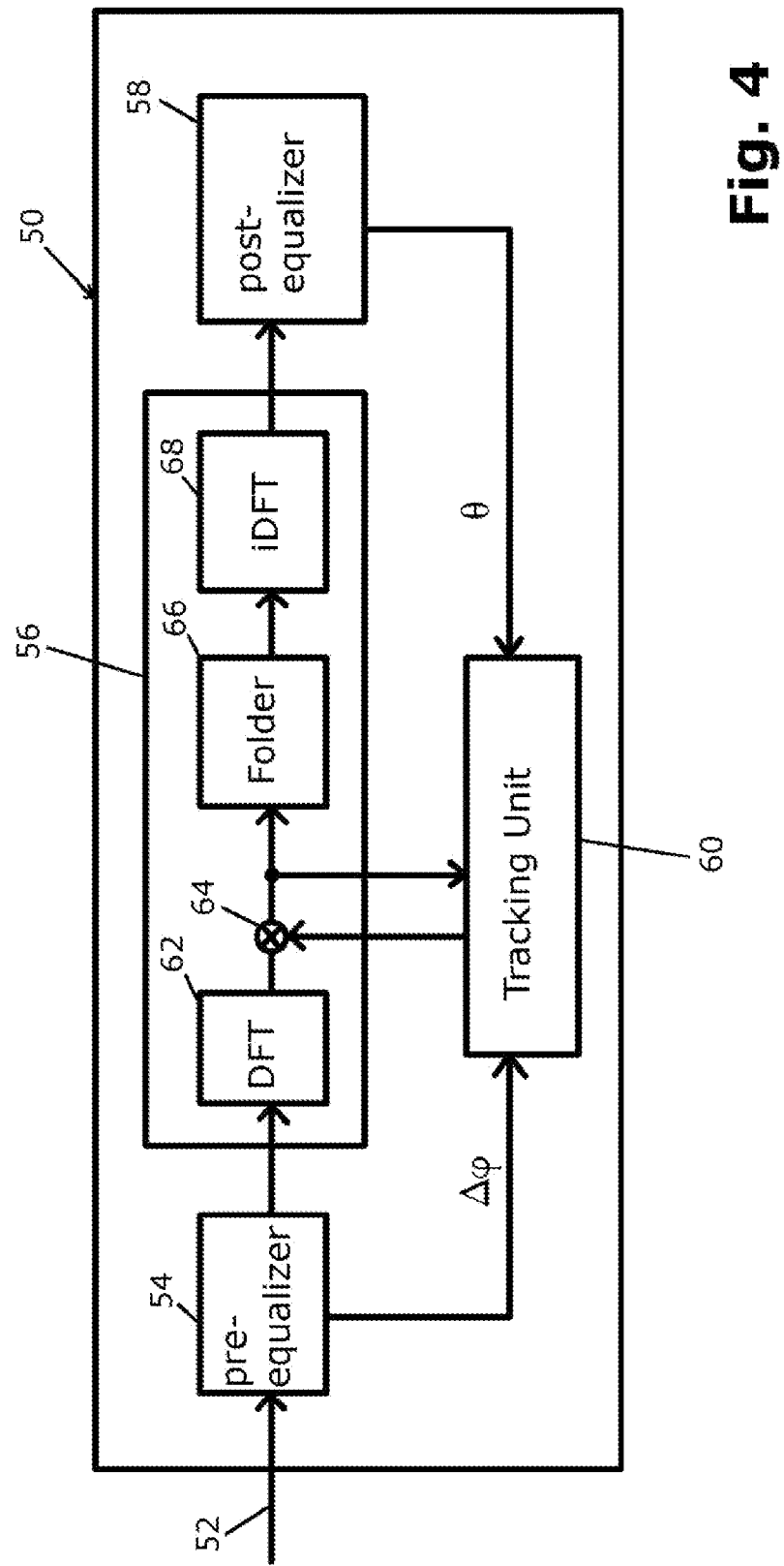
FIG. 4 shows a simplified block diagram of another exemplary device including a tracking unit.

FIG. 4 shows a device 50 which may be a receiver and more specifically a radio receiver and which may include an input 52. FIG. 4 shows a qualitative example not including necessarily all components. The device 50 may include a pre-equalizer 54, an equalizer 56 and a post-equalizer 58. The input 52 may be coupled to an antenna to receive a radio signal transmitted via a propagation channel. The input 52 may be coupled to a digital front end to receive a digital baseband signal. The input 52, the pre-equalizer 54, the equalizer 56 and the post-equalizer 58 of the device 50 may be the same or similar to the input 22, the pre-equalizer 24, the equalizer 26 and the post-equalizer 28 of device 20. In this example, the post-equalizer 58 may be optional. The radio receiver 50 may not necessarily include the post-equalizer 58. The input 52, the pre-equalizer 54, the equalizer 56 and the post-equalizer 58 of the device 50 may be interconnected as may be the equivalent components of the device 20.

The device 50 may further include a tracking unit 60. The tracking unit 60 may be coupled with a first input to a phase shift output of the pre-equalizer 54 to receive an estimated phase shift $\Delta\phi$. The tracking unit 60 may be coupled with a second input to a phase error output of the post-equalizer 58 to receive an estimated post-equalizer phase error $\theta$. The second input of the tracking unit 60 may be optional as the post-equalizer 58 may also be optional. The tracking unit 60 may be coupled with an output to an input of equalizer 56. Tracking unit 60 is further coupled with an input to an output of the equalizer 56. The tracking unit 60 may provide equalizer coefficients to the equalizer 56 that have been adapted using a "block's common phase error".

The equalizer 56 may include a digital Fourier transformer DFT 62, a multiplier 64, a folder 66 and an inverse digital Fourier transformer DFT 68. The equalizer 56 may be adapted to equalize data blocks. The sampled signal supplied from the pre-equalizer 54 to the equalizer 56 may be first transformed by the DFT 62 into the frequency domain. The transformed signal may then be multiplied in the multiplier 64 by an equalization coefficient delivered by the tracking unit 60, which provide also correction of "block's common phase error" and of timing drift. The equalized signal in the frequency domain may be folded by the folder 66 and fed to the iDFT 68. In the iDFT 68 the signal may be transformed by an inverse Fourier transformation back to the time domain. The tracking unit 60 may provide the equalization coefficients to the equalizer 56 that have been adapted using the "block's common phase error" and may receive initial equalization coefficients from the equalizer 56 as will be explained below with reference to FIGS. 6 and 7.

Figure 5:
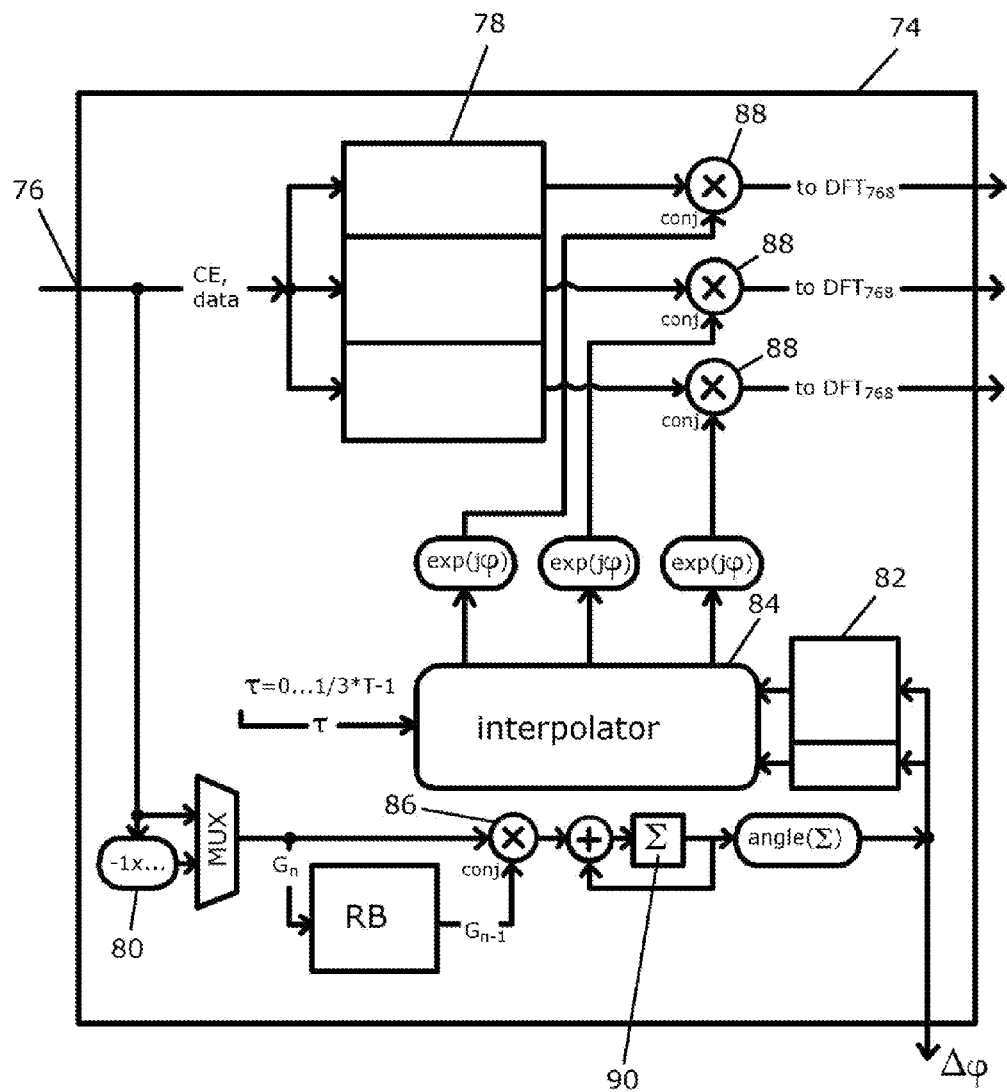
FIG. 5 shows a simplified block diagram of a pre-equalizer.

FIG. 5 shows a simplified block diagram of a pre-equalizer 74 which may be used at the place of the pre-equalizers 14, 24 and 54. FIG. 5 shows a qualitative example not including necessarily all components. The pre-equalizer 74 may include a storage area 78, a multiplexer MUX, an interpolator 84 and a register 82. An input of the storage area 78 and an input of the MUX may be coupled to an input 76 of the pre-equalizer 74. An output of the MUX may be coupled to an input of the interpolator 84. The pre-equalizer 74 may further include the multipliers 88 coupled between an output of the interpolator 84 and an output of the storage area 78. The multipliers 88 may have an output that may be coupled to an equalizer.

The pre-equalizer 74 may receive at the input 76 a sampled single carrier signal. The signal may be delivered from a digital receiver front end which may be included in the device. The signal may have a structure as explained with reference to FIG. 3.

For channel estimation, a channel estimation data field CE 32 may be received first. While the gu and gv blocks may be transmitted to the storage area 78, known signal parts used for phase shift estimation may be fed to the multiplexer MUX. The known signal parts may be known to the device. The known signal parts may be cyclically repeating. For the CE 32 these may be the Gb Golay sequences or more specifically parts of the Gb Golay sequences as indicated by the hatched boxes 42 in FIG. 3. The relevant signal parts may be detected in the digital receiver front end or in the phase estimator 74.

In the shown example, the pre-equalizer 74 may further include an inverter 80 and a reference buffer RB. The inverter 80 may be coupled to the MUX. The inverter 80 may be used to convert the Gb Golay sequences to have all the same signs. As shown in FIG. 3, there may be five Gb sequences: Gb0, Gb1, Gb2, Gb3 and Gb4. The sequences, respectively the parts used, may be successively written into the reference buffer RB. A multiplier 86 and accumulator 90 may compute Hermitian dot-product of Gb sequence output from buffer RB with the succeeding Gb sequence. For example, Gb0 may be Hermitian dot-multiplied with Gb1, or more generally, $Gb_{n-1}$ may be Hermitian dot-multiplied with $Gb_n$. The angle $\phi$ of the Hermitian dot product may be extracted. This angle may correspond to the estimated phase shift $\Delta\phi$ which may be fed to the tracking unit 60 (see FIG. 4).

With reference to FIG. 3, gu may include three Gb sequences and gv may also include three Gb sequences, wherein the −Gb2 sequence may be shared by the two blocks gu and gv. Therefore, for the block gu two phase shifts may be estimated: a first phase shift for the first half of gu, i.e. a phase shift from middle-to-beginning of the block gu and a phase shift from end-to-middle of the block gu. The same holds true for the block gv. Evidently, in another signal structure having more Gb sequences per block or other repetitive signal parts usable for phase shift estimation, even more phase shifts for fractions of a block may be estimated.

The estimated phase shift $\Delta\phi$ may be further stored in the storage area 82 which is shown to have two parts, i.e. for storing middle-to-beginning phase shift and end-to-middle phase shift. However, as explained above, more or less phase shifts per block may be estimated. The estimated phase shift(s) for the first block gu may be used in the pre-equalizer 74 to correct the gu phase. In other words, the block gu may be corrected, in particular derotated, using the estimated phase shift(s). Correcting or derotating using the estimated phase shift means basically to minimize a difference between a signal phase error at the beginning of a block and a signal phase error at the end of a block due to derotation of the block by a continuous phasor whose phase increment along the block is equal to the phase shift. In the same way, the estimated phase shift(s) for the second block gv may be used in the pre-equalizer 74 to correct the gv phase. In other words, the block gv may be corrected, in particular derotated, using the estimated phase shift(s). Therefore, the storage area 82 may be coupled to an interpolator 84 which may be adapted to effectuate a piecewise linear interpolation. The interpolator 84 may receive as further input a sample number $\tau$. The output of the interpolator is used to compute a continuous phasor. The conjugated continuous phasor may be multiplied by the multipliers 88 with the gu respectively gv samples stored in the storage area 78. For preparing Fourier transformation, where triples of samples may be required, multiplication may be effectuated in parallel for the first, the second and the third of the samples. In the present example, 768 samples may be in one block. The corrected (or derotated) blocks gu and gv may be fed to e.g. the equalizer 56 (see FIG. 4).

Furthermore, the "block's common phase error" of gu may be set to zero. This results in $GU^{ref}$ being equal to initial $GU^{ref}$. The beginning-to-middle phase shift of gv may be added to the middle-to-end phase shift of gu and may be used as "block's common phase error" of gv. $GV^{ref}$ may therefore be equal to initial $GV^{ref}$ rotated by the "block's common phase error" of gv and by a linear phase factor accounting for the time drift.

For demodulation of the blocks, i.e. the data blocks 38 together with the guard interval GI 40, the pre-equalizer 74 may work quite similar as for the channel estimation. The data blocks 38, including the header 36, which may follow the channel estimation field in a supposed signal structure according to FIG. 3 may be received. For the data blocks 38, GI 40 may be used for phase shift estimation as indicated by the hatched boxes 44. Thus, only one phase shift may be estimated per data block 38. The inverter 80 may not necessarily be used during demodulation as the guard intervals may have the same sign. Similar to channel estimation, the guard interval from the beginning of the data block 38 may be Hermitian dot-multiplied in the multiplier 86 and accumulator 90 with the guard interval from the end of the data block 38 to estimate phase shift of the data block 38 from beginning-to-end. The estimated phase shift $\Delta\phi$ may then be used to correct, in particular derotate, the data block 38 using the interpolator 84, the register 82 and the storage area 78 as explained with reference to channel estimation.

It is to be understood that the pre-equalizer 74 may be used as well for correcting, in particular derotating, the channel estimation blocks gu and gv as for correcting, in particular derotating, the data blocks 38, data block per data block.

The corrected (or derotated) blocks may be fed to the equalizer 56 and more specifically to the DFT 62 in FIG. 4 for demodulation/correlation/equalization. It should be understood that in the simplified block diagram of FIG. 4 only one line between the pre-equalizer 54 and the DFT 62 is shown, which may, however, be three-fold to send triples of samples to the DFT 62.

Figure 6:
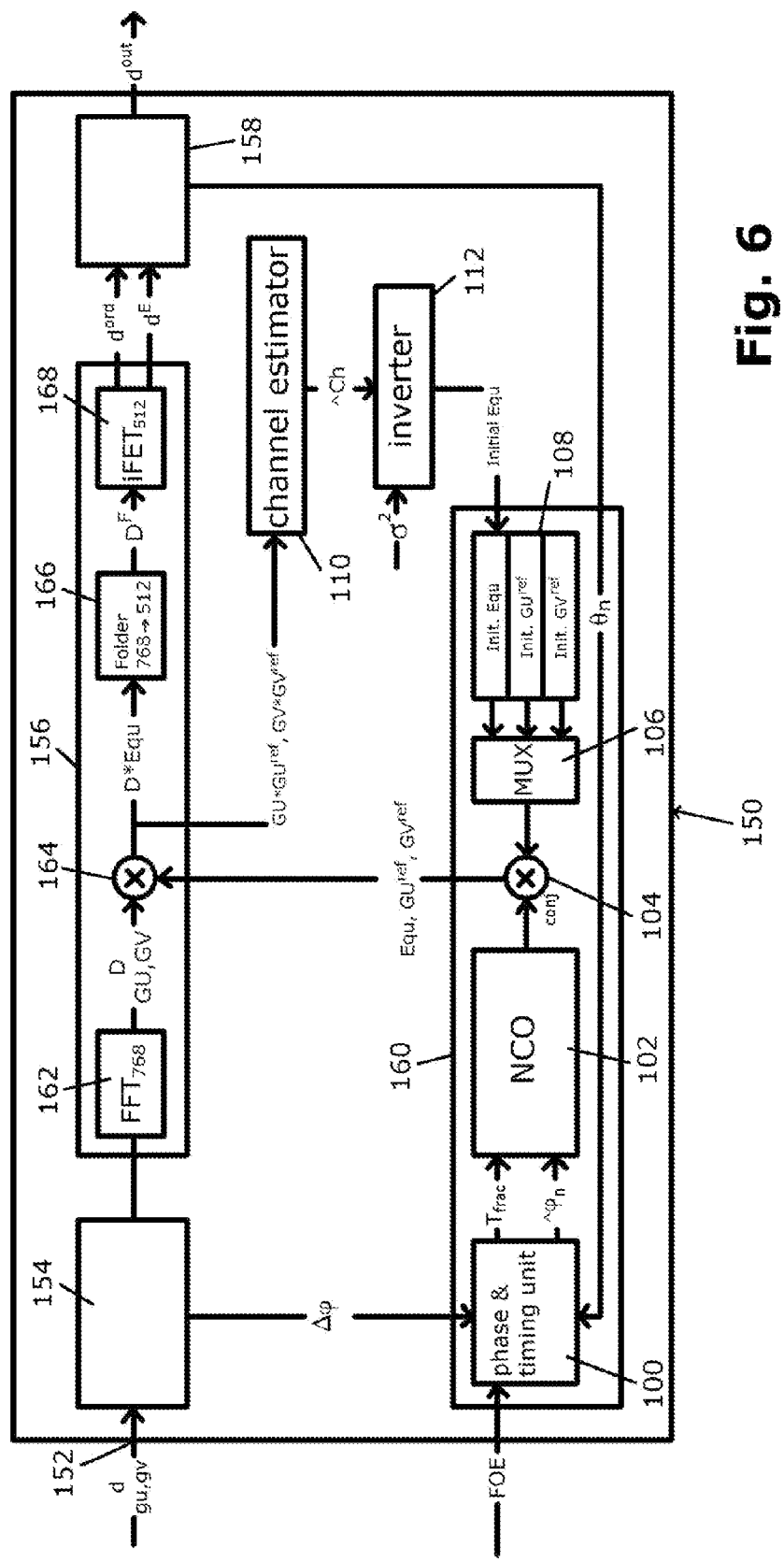
FIG. 6 shows a simplified block diagram of another exemplary device including a channel estimator.

FIG. 6 shows another example of a device 150, e.g. a radio receiver. FIG. 6 shows a qualitative example not including necessarily all components. The device 150 may be similar to the device 50 shown in FIG. 4. Reference signs for the same components may be augmented by 100. As for the device 50, the post-equalizer 158 may be optional. The device 150 may further include a channel estimator 110 and an inverter 112. The channel estimator 110 may be coupled with an input to the equalizer 156, and more exactly to an output of the multiplier 164. The channel estimator 110 may be coupled with an output to an input of the inverter 112. The inverter 112 may be coupled with an output to an input of a tracking unit 160.

The device 150 may receive at an input 152 a signal d (for data), gu, gv as shown in FIG. 3. The small letters d, gu and gv may indicate the time domain. The equalizer 156 may include a Fast Fourier Transformer 162. The fast Fourier transformation may be an efficient implementation of a DFT. The transformation may be done for blocks (i.e. gu, gv, header, data block) on 768 samples. The capital letters at the output of the FFT 162 may indicate the frequency domain. After multiplication at the multiplier 164, the multiplied block may be fed to a folder 166. The folder 166 may fold the block from 768 samples to 512. It is understood that this demodulation may only be effectuated for the data field 34. The channel estimation field 32 may not be demodulated and gu and gv may not be fed into the folder 166. Capital $D^F$ may indicate a signal in folded frequency domain. The inverse fast Fourier transformation may then be effectuated on 512 samples. It is to be understood that the numbers of samples may only be given as examples and they are not to be considered as limiting. The Fourier transformer 168 may put out the equalized data blocks (data section and GI), first in interleaved order ($d^E$) and then in the natural order ($d^{ord}$), small letters may indicate the time domain.

The tracking unit 160 may include a phase & timing unit 100, a numerically controlled oscillator NCO 102, a multiplier 104, a multiplexer MUX 106 and a storage unit 108. The phase & timing unit 100 may have an input coupled to a phase shift output of the pre-equalizer 154 to receive the estimated phase shift Asp. The phase & timing unit 100 may be coupled with a second input to a phase error output of the post-equalizer 158 to receive the estimated phase error $\theta$. The phase & timing unit 100 may have a third input for receiving a frequency offset estimate FOE which may be delivered by a digital front end of receiver 150. The phase & timing unit 100 may be adapted to control a phase of the NCO 102. The function of the phase & timing unit 100 is explained with reference to FIG. 7.

The phase & timing unit 100 may have a first output and a second output coupled to a first input and a second input of the NCO 102, respectively. The phase & timing unit 100 may feed a time fraction $T_{frac}$ and a "block's common phase error" (to be used as the phase slope and the phase bias correspondently) to the NCO 102. The NCO 102 may have an output coupled to the multiplier 104. The multiplier 104 may receive a second input from the MUX 106 as explained below. If the received block is a channel estimation block, the multiplier 104 may output to the equalizer 156 a reference value $GU^{ref}$ for channel estimation block gu, respectively a reference value $GV^{ref}$ for channel estimation block gv. Determination of the reference values is explained below. If the received block is a data block, the multiplier 104 may output equalization coefficients Equ to the equalizer 156.

During channel estimation, i.e. when the device 150 may receive the channel estimation field, the multiplier 104 may form the products $GU*GU^{ref}$ and $GV*GV^{ref}$. These products may be fed to the channel estimator 110. The channel estimator 110 may sum the two products. The sum may be smoothed by passing through a low pass filter (LPF). The smoothed sum may correspond to the channel estimate ˆCh.

$$\hat{C}h = LPF(GU*GU^{ref} + GV*GV^{ref}) \quad (1)$$

It may be an advantage that the obtained channel estimate ˆCh may be immune against phase noise, $GV^{ref}$ taking into account the phase noise. The channel estimate ˆCh may be fed to the inverter 112. The inverter 112 may use a minimum mean square error (MMSE) estimation. The inverter 112 may form a pseudo-inverse or generalized inverse of the channel estimate. The generalized inverse may determine an initial equalization coefficient InitEqu that may be used as a start value for the equalization process.

$$InitEqu = PseudoInv(\hat{C}h) \quad (2)$$

The initial equalization coefficient InitEqu may be fed to the tracking unit 160. The tracking unit 160 may store InitEqu, an initial $GU^{ref}$ and an initial $GV^{ref}$ in the storage 108. The MUX 106 may deliver the initial $GU^{ref}$ to the multiplier 104 while the gu block may be processed and the initial $GV^{ref}$ while the gv block may be processed. During processing of data blocks, the MUX 106 may deliver InitEqu for equalization of data. In the multiplier 104, initial $GU^{ref}$, initial $GV^{ref}$ or InitEqu may be multiplied with the output of the NCO 102. The multiplier 104 may output to the equalizer 156 the value, $GU^{ref}$, $GV^{ref}$, or EquCoeff, respectively, wherein $$GU^{ref} = NCO*\text{init } GU^{ref} \quad (3)$$

$$GV^{ref} = NCO*\text{init } GV^{ref} \quad (4)$$

$$\text{EquCoeff} = NCO*\text{InitEqu} \quad (5).$$

The post-equalizer 158 may deliver a phase error $\theta_n$ to the phase & timing unit 100, which may be an estimate of the residual error after corrections done by the pre-equalizer 154 and by the equalizer 156

Figure 7:
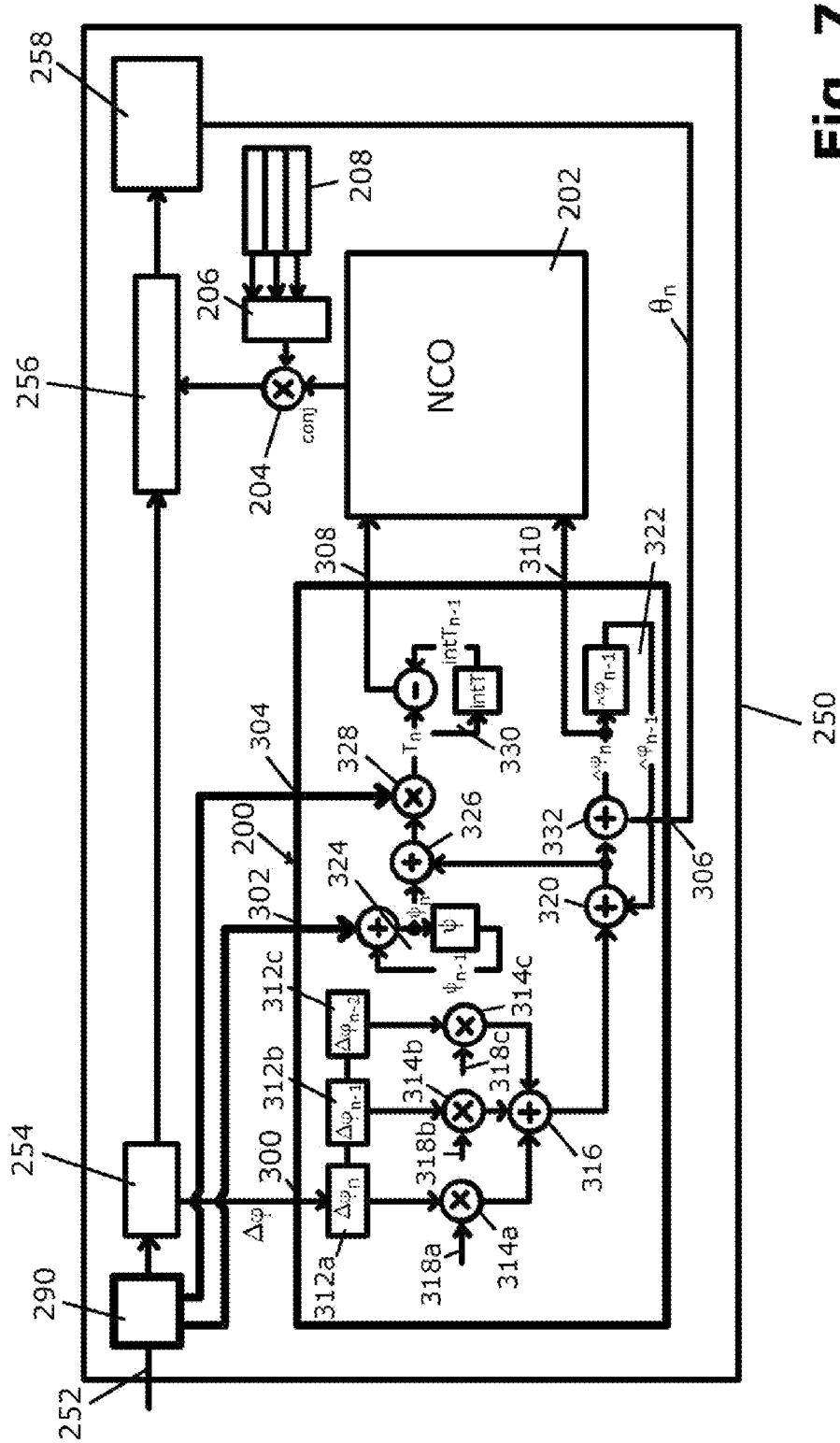
FIG. 7 shows a simplified block diagram of another exemplary device.

FIG. 7 shows another example of a device 250. FIG. 7 shows a qualitative example not including necessarily all components. The device 250 may be similar to the device 150 shown in FIG. 6. Reference signs for the same components may be augmented by 100. For clarity reasons the channel estimator and the inverter are not shown. The device 250 may include a digital receiver front end 290 that may be coupled between the receiver input 252 and the pre-equalizer 254. It is understood that the devices 10, 20, 50 and 150 may also include a digital receiver front end. In the digital receiver front end 290 the radio signal may be sampled and digitized. A carrier frequency offset estimate FOE may be determined. Estimation may be done using the short training field STF mentioned with reference to FIG. 3. The front end 290 may output the FOE to the phase & timing unit 200. Fsample may be a nominal sampling frequency. Fcarrier may be a nominal carrier frequency. Both frequencies may be locked together. The ratio may provide information of the locking relation.

FIG. 7 shows a possible implementation of the phase & timing unit 200. The phase & timing unit 200 may include three inputs. At a first input 300 the estimated phase shift Asp that may be provided from the pre-equalizer 254 may be input. At a second input 302 the frequency offset estimate FOE that may be probably provided from a digital receiver front end may be input. At a third input 304 a ratio Fsample to Fcarrier may be input. The phase & timing unit 200 may include a fourth input 306 that may be coupled to an output of the post-equalizer 258. To the fourth input 306 an estimated post equalizer phase error $\theta_n$ may be input. To CE blocks and data blocks may be assigned the following serial numbers: gu=block[−2], gv=block[−1], header=block[0], and so on. To the estimated phase shifts may be assigned the following serial numbers: gu beginning-to-middle phase shift=$\Delta\phi_{-4}$, gu middle-to-end phase shift=$\Delta\phi_{-3}$, gv beginning-to-middle phase shift=$\Delta\phi_{-2}$, gv middle-to-end phase shift=$\Delta\phi_{-1}$, header begin-to-end phase shift=$\Delta\phi_0$, and so on.

The phase & timing unit 200 may include two outputs 308 and 310 which may be coupled to an NCO 202. At the output 308 the time fraction Tfrac may be provided and at the output 310 the "block's common phase error" estimate per block $\hat{\phi}_n$ may be provided to the NCO 202. The phase & timing unit 200 may include three storage units 312a, 312b and 312c which may be implemented as a shift register. The storage unit 312a may be connected to the input 300 and to the storage unit 312b. The storage unit 312b may be further connected to the storage unit 312c. The phase & timing unit 200 may include three multipliers 318a, 318b and 318c. The multiplier 318a may be connected to the storage unit 312a. The multiplier 318b may be connected to the storage unit 312b. The multiplier 318c may be connected to the storage unit 312c. The outputs of the multipliers 318a, 318b and 318c may be connected together in an adder 316.

In function, estimated phase shifts $\Delta\phi_n$ output from the pre-equalizer 254 may be stored in storage units 312a . . . c. In other words, the last estimated phase shift $\Delta\phi_n$ may be stored in the storage unit 312a while the precedent may be passed to the storage unit 312b and then to the storage unit 312c. In FIG. 7, the storage unit 312a may contain the estimated phase shift $\Delta\phi_n$, the storage unit 312b may contain the estimated phase shift $\Delta\phi_{n-1}$, and the storage unit 312c may contain the estimated phase shift $\Delta\phi_{n-2}$. The phase shifts may be read from the storage units and may be multiplied by weighting factors in the multipliers 318a . . . c. Then, the weighted phase shifts may be added in the adder 316. This way, the phase shifts may be combined with different weight coefficients, to estimate $\Delta_n$=difference between "block's common phase error" of the current block and the previous one. For example, the signal structure of FIG. 3 corresponds to the following combining scheme: $\Delta_{-2}=0\cdot\Delta\phi_{-4}+0\cdot\Delta\phi_{-3}$, $\Delta_{-1}=1\cdot\Delta\phi_{-3}+1\cdot\Delta\phi_{-2}$, $\Delta_0=5/4\cdot\Delta\phi_{-1}+\frac{1}{2}\cdot\Delta\phi_0$, $\Delta_1=\frac{1}{2}\cdot\Delta\phi_0+\frac{1}{2}\cdot\Delta\phi_1$, $\Delta_2=\frac{1}{2}\cdot\Delta\phi_1+\frac{1}{2}\cdot\Delta\phi_2$ and so on. The adder 320 may be coupled to accumulator 332 allowing computing of the current "block's common phase error" $\hat{\phi}_n$.

The estimated "block's common phase error" $\hat{\phi}_n$ may be output at output 310 to the NCO 202. The accumulator 332 may allow adding the post equalizer phase error $\theta$ of the previous block (computed and delivered by the post-equalizer 258). In this case the post-equalizer phase error $\theta$ may permit to further enhance the quality of phase correction. Due to this feedback, phase & timing unit 200 may accumulate any number of $\Delta_n$ without degradation of $\hat{\phi}_n$ accuracy.

Digital Front End (DFE) may derotate the signal by linear phasor with the slope of Frequency Offset Estimate (FOE); the latter may be delivered to phase & timing unit 200 at input 302, and may be coupled to accumulator 324, which accumulates the phase $\psi$ of "block's common derotation in DFE". In an adder 326 the phase shift $\phi$ estimated from the pre-equalizer 254 and phase $\psi$ estimated from the front end 290 may be added. In a multiplier 328 the sum of phase shift $\phi$ and phase $\psi$ may be multiplied by the locking ratio Fsample/Fcarrier. The multiplier 328 may provide at an output a block time shift $T_n$. A circuit 330 may determine a fractional part and an integer part of the time shift and outputs a fractional time shift $T_{frac}$ at output 308 to the NCO 202. The phase & timing unit 200 may control the NCO 202 accordingly to have a phase of $$\exp\left(j\frac{2\pi f}{N}Tfrac + j\varphi_n\right), f = -N/2 \ldots N/2 - 1 \quad (7)$$

where N is the number of samples in a block, e.g. N=768.

In the embodiments of FIGS. 6 and 7, post-equalizer 158, 258 may compute post equalizer phase error from $d^E$, using the GI and/or the data section. The post-equalizer 158, 258 may deliver post equalizer phase error to phase & timing unit 100, 200. Also, it may use post equalizer phase error for correction (derotation) of the equalized-and-ordered symbols $d^{Ord}$, thus computing the output $d^{Out}$.

Figure 8:
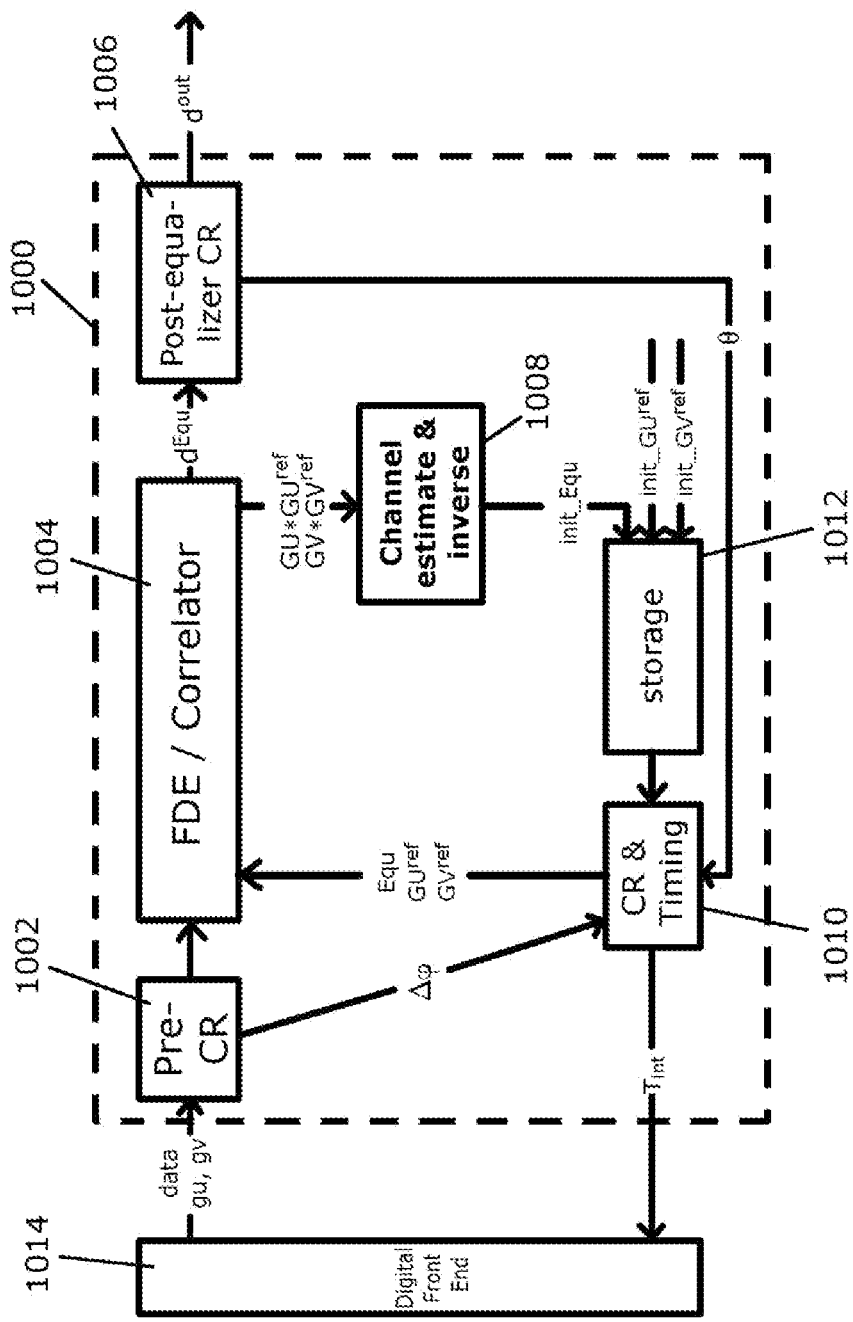
FIG. 8 shows a simplified block diagram of a further example including a sub-unit which computes a component of phase error to correct, in particular derotate, the signal before FDE.
Figure 9:
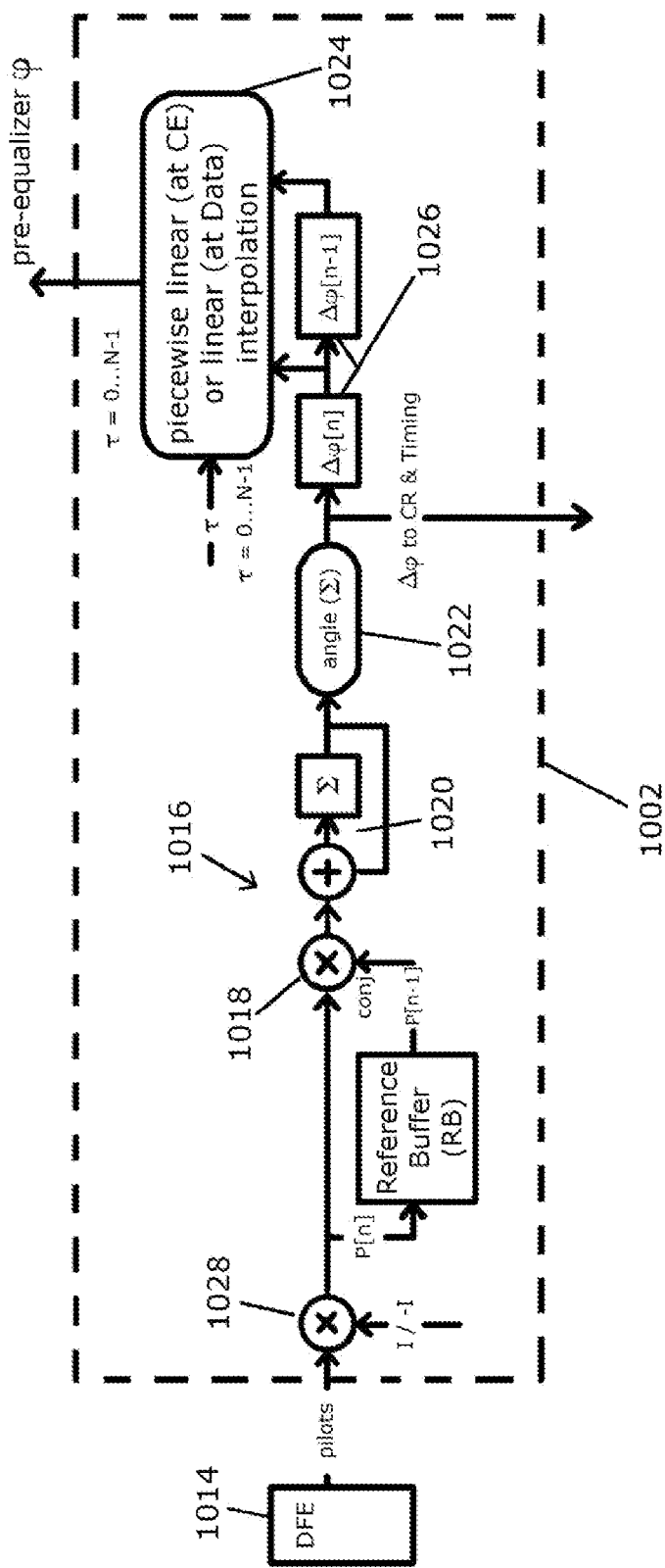
FIG. 9 shows a simplified block diagram of the sub-unit of FIG. 8 which computes a component of phase error to correct, in particular derotate, the signal before FDE.
Figure 10:
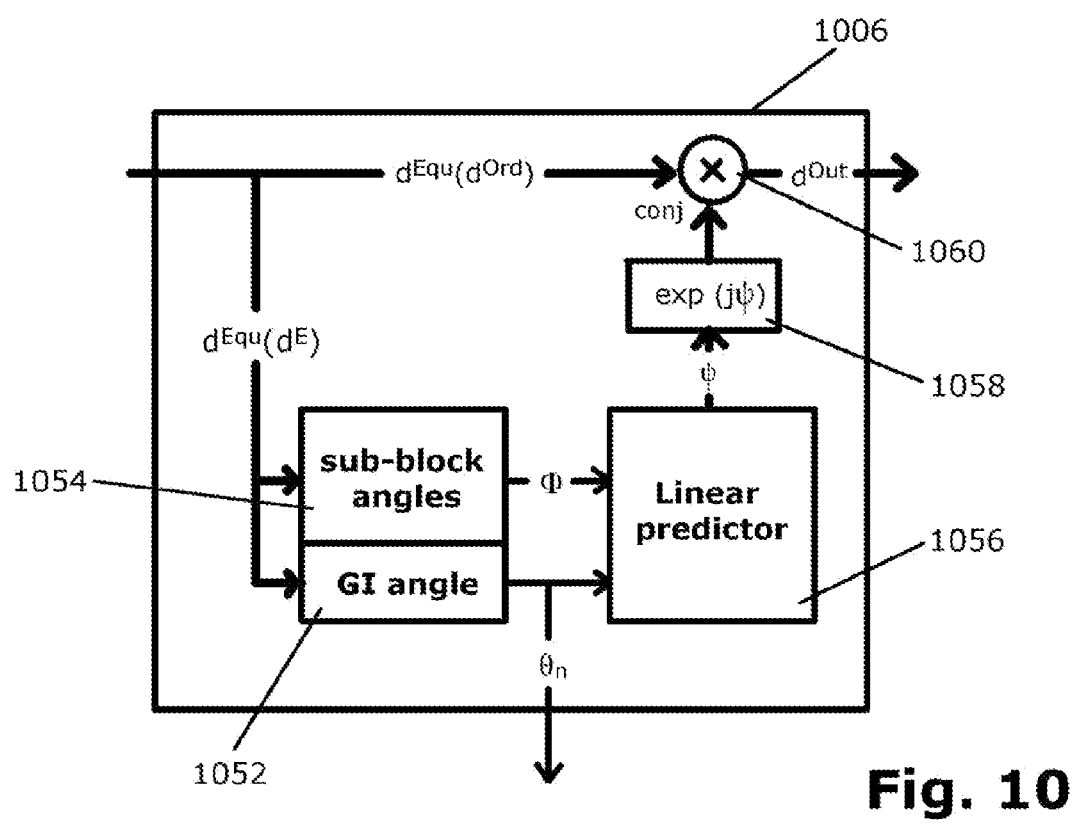
FIG. 10 shows a more detailed block diagram of a post equalizer.

FIGS. 8, 9 and 10 show a further example. This example is similar to the example explained with reference to FIGS. 4 to 7. The following description is intended to further facilitate understanding of operation of equalization and the different operation modes. FIG. 8 shows a demodulator 1000 as part of a device, e.g. a radio receiver. Demodulator 1000 may include a pre-equalizer CR unit 1002, an FDE/correlator unit 1004, a post-equalizer CR unit 1006, a channel estimate & inverse unit 1008, a CR & timing unit 1010 and a storage 1012 for storing initial coefficients.

As explained above, CR may stand for the process of carrier recovery to further emphasize the idea behind. Nevertheless, it is understood that the example of FIGS. 4 to 7 also relates to carrier recovery. FIG. 8 is similar to FIG. 4 and some functions may be best understood by comparing FIGS. 4 and 8. The pre-equalizer CR unit 1002 may be coupled to a digital front end 1014 to be fed with a sampled base band signal.

When receiving a signal from the digital front end 1014, the demodulator 1000 may start to operate in a channel estimation mode. Afterwards, the demodulator 1000 may switch to a demodulation mode. In the different operation modes functionality of the units may be different.

The pre-equalizer CR 1002 may compute angles $\Delta\phi[n]$ between an n-th received pilot and the next one, i.e. an (n+1)-th received pilot, if their correspondent Tx pilots are the same. The pre-equalizer CR 1002 may send $\Delta\phi[n]$ to CR & Timing unit 1010. Additionally, the pre-equalizer CR 1002 may compute pre-equalizer $\phi$ which is a continuous phasor whose phase increment along the block is equal to the phase shift estimate, and using pre-equalizer $\phi$, it may correct, in particular derotate, a data block situated between the n-th and the (n+1)-th received pilot. After correction (or derotation), the phase errors at the edges of the block may become the same; thus FDE degradation caused by the phase error difference at the edges may be avoided. The corrected, in particular derotated, block may be fed to the FDE/Correlator 1004.

"Phase Error feed-forward Estimate" (PEE_FF) may be defined as a continuous piecewise-linear function with the following properties:

a) if $\Delta\phi[n]$ is estimated, a linear section starts at the middle of the n-th received pilot;
b) a slope of this section is equal to $\Delta\phi[n]$ divided by "length of time interval from the middle of the n-th pilot to the middle of the next pilot".

Pre-equalizer $\phi$ may have the same slope as PEE_FF, but it may be equal to zero in the middle of a signal block. Note that details of the pre-equalizer 1002 are further explained below with reference to FIG. 9.

Some functional differences according to the operation mode are explained in the following. In the channel estimation mode, the storage 1012 may deliver pre-computed patterns (init_$GU^{ref}$/init_$GV^{ref}$) to the CR & timing unit 1010. In the demodulation mode, the storage 1012 may deliver initial FDE coefficients (init_Equ) to the CR & timing unit 1010. In the demodulation mode, the CR & timing unit 1010 may compute "block's common phase error" accumulating history of $\Delta\phi$ and $\theta$ values. In the channel estimation mode, the CR & timing unit 1010 may compute "block's common phase error" accumulating history of $\Delta\phi$ only.

In the channel estimation mode, the CR & timing unit 1010 may compute from "block's common phase error" and from init_$GU^{ref}$/init_$GV^{ref}$ the patterns $GU^{ref}$/$GV^{ref}$ and may deliver them to the FDE/correlator 1004. In the demodulation mode, the CR & Timing unit 1010 may compute from "block's common phase error" and from init_Equ the coefficients Equ and may deliver them to the FDE/correlator 1004.

In channel estimation mode, the FDE/correlator 1004 may work as frequency domain correlator. The FDE/correlator 1004 may compute Fourier-transform GU/GV of the corrected, in particular derotated, gu/gv block, may multiply it by $GU^{ref}$/$GV^{ref}$ and may deliver the product $GU \cdot GU^{ref}$/$GV \cdot GV^{ref}$ to the Channel estimate & inverse unit 1008. In demodulation mode, the FDE/correlator 1004 may work as a Frequency Domain Equalizer. It may perform Frequency Domain Equalization of the corrected, in particular derotated, block using the coefficients "Equ", and compute $d^{Equ}$. In some examples, $d^{Equ}$ may be delivered twice: first time concurrently with iFFT computation, in an interleaved order; second time in the natural order.

The channel estimate & inverse unit 1008 may work in channel estimation mode only. The channel estimate & inverse unit 1008 may compute "init_Equ" from $GU \cdot GU^{ref}$ and $GV \cdot GV^{ref}$, and may deliver "init_Equ" to the storage 1012. The function of the pre-equalizer CR 1002 during channel estimation mode may mitigate the impact of phase error on FDE coefficients. The function of the CR & Timing 1010 during channel estimation mode may mitigate the impact of phase error on FDE coefficients.

When "init_Equ" is computed, the demodulator 1000 may enter the demodulation mode. The post-equalizer CR unit 1006 may function in demodulation mode only. The post-equalizer CR unit 1006 may compute an angle $\theta$ between the equalized GI and its ideal pattern and may deliver $\theta$ to the CR & timing unit 1010. The post-equalizer CR unit 1006 may also compute an estimate of phase error residue or remaining phase error at an inner part of the equalized block and may correct, in particular derotate, the block by that estimate. This is further explained below with reference to FIG. 10.

FIG. 9 shows a simplified block diagram of the pre-equalizer CR 1002 shown in FIG. 8 which may compute a component of phase error prior to frequency domain equalization. In other words, the pre-equalizer CR 1002 may compute a sequence of angles which can be used for signal correction, in particular signal derotation, before FDE. FIG. 9 is similar to the lower part of FIG. 5 and some functions may be best understood by comparing FIGS. 5 and 9.

The pre-equalizer CR 1002 may include a reference buffer RB and a dot-product calculator 1016 including a multiplier 1018 and an adder-accumulator E 1020. The pre-equalizer CR 1002 may further include an angle calculator 1022, an interpolator 1024 and a shift register 1026. The interpolator 1024 may be a linear/piecewise-linear interpolator. An input of reference buffer RB may be coupled to the digital front end 1014 through a multiplier 1028 adapted to multiply by a factor of ±1. The multiplier 1028 can thus remove the pre-known coefficients of ±Gb pilots. An output of the angle calculator 1022 may be delivered to the shift register 1026. An output of the shift register 1026 may be coupled to the interpolator 1024. An output of the interpolator 1024 may be coupled to the FDE/correlator 1004 delivering a pre-equalizer $\phi$ to be used for the block correction, in particular block derotation, before FDE.

FIG. 10 shows in more detail the post-equalizer CR unit 1006 of FIG. 8, which may include a GI angle sub-unit 1052, a sub-blocks angles sub-unit 1054, a linear predictor sub-unit 1056, a look-up table (LUT) for exponents "exp(j$\psi$)" 1058 and a complex multiplier 1060.

An equalized data block $d^{Equ}[n]$ may be regarded as a sequence of symbols d[n,0] ... d[n,M−1], where M may be a total number of symbols in a block. GI angle sub-unit 1052 may separate the equalized GI[n] from $d^{Equ}[n]$, may compute angle $\theta$ of the dot-product: equalized GI·ideal GI-pattern and may deliver the computed angle $\theta$ to the tracking unit 160 and to the linear predictor sub-unit 1056.

The sub-blocks angles sub-unit 1054 may separate several (overlapped) intervals of an equalized block (so called sub-blocks b[n,1] ... b[n,S] of $d^{Equ}[n]$). For each sub-block b[n,s], the sub-blocks angles sub-unit 1054 may compute $\Phi[n,s]$ which may be the angle of constant rotation having maximal likelihood (ML) under given symbols of b[n,s] and under strong additive noise. The sub-blocks angles sub-unit 1054 may deliver the vector $\Phi[n]=\Phi[n,1] ... \Phi[n,S]$ to the linear predictor sub-unit 1056.

The linear predictor sub-unit 1056 may store a pre-computed matrix of weight coefficients c[$\tau$,s], s=1 ... S, $\tau$=0 ... M−1. For each symbol d[n,$\tau$], the linear predictor sub-unit 1056 may compute the angle $\psi[n,\tau]=c[\tau,0]\cdot\theta[n]+c[\tau,1]\cdot\Phi[n,1]+\ldots+c[\tau,S]\cdot\Phi[n,S]$ and may deliver it to the look-up table (LUT) for exponents "exp(jψ)" 1058.

The symbols d[n,τ] and the exponents exp(jψ[n,τ]) may be delivered to the multiplier 1060 that may compute the product d[n,τ]·conj(exp(jψ)) for each symbol d[n,τ]. Thus, a stochastic rotation which distorts inner parts of equalized blocks may be mitigated.

Figure 11:
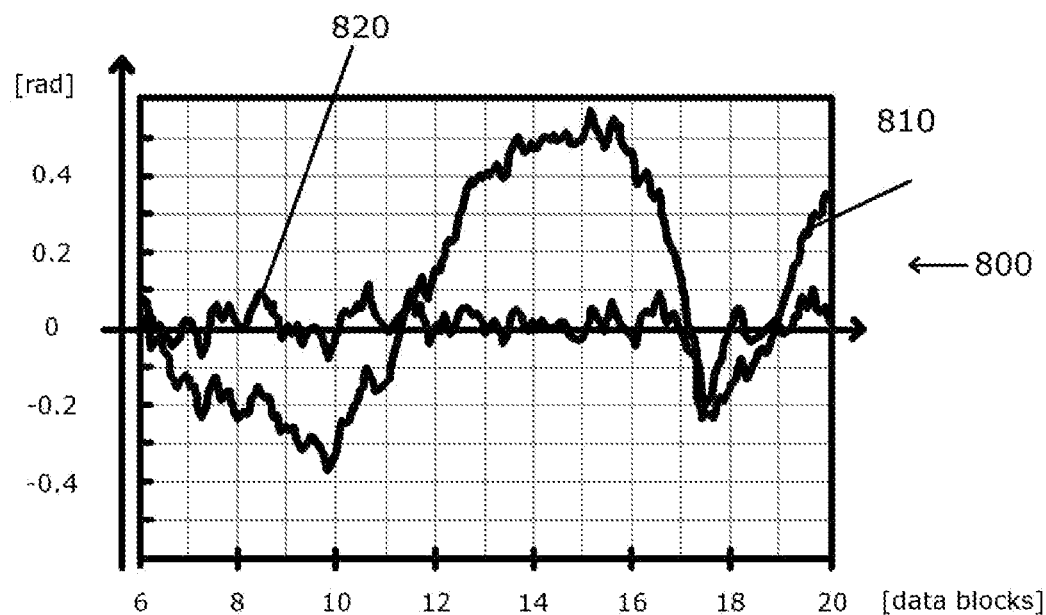
FIG. 11 shows a graph of phase noise over several signal blocks after demodulation.
Figure 12:
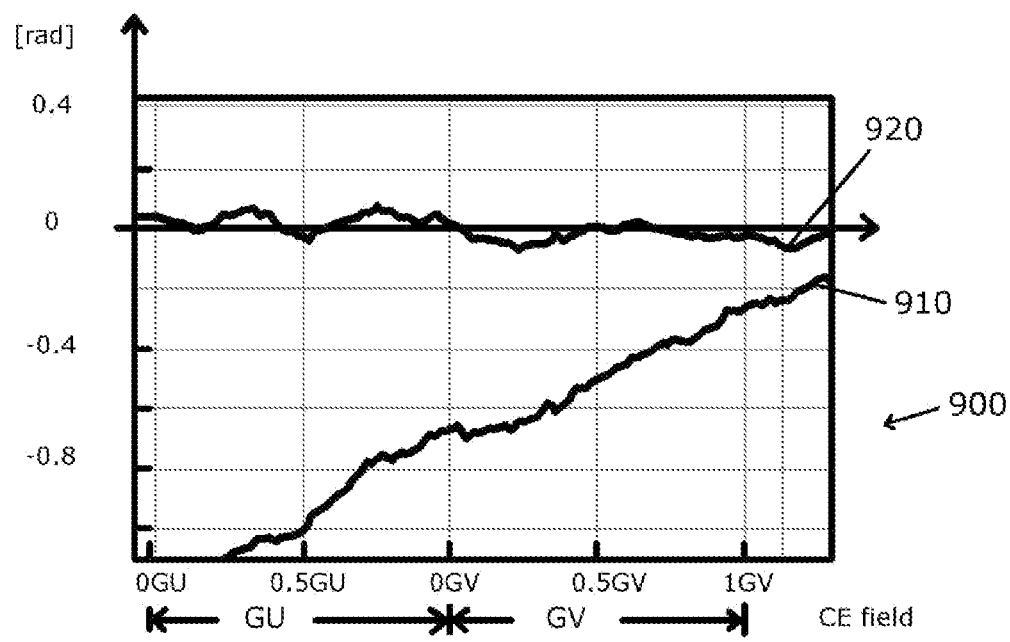
FIG. 12 shows a graph of phase noise over a channel estimation field.

The results obtained with the example devices are shown in FIGS. 11 and 12. FIG. 11 shows in a graph 800 a phase noise in radian over several data blocks after demodulation. A line 810 shows the phase noise when no pre-equalizer and post-equalizer are used. The phase noise varies over the data blocks. While e.g. data blocks 9 and 10 may experience a phase noise of about −0.3 radian, data block 15 may have a phase noise of about +0.5 radian. A line 820 shows the phase noise over data blocks 6 to 20 when using the pre-equalizer. The phase noise may rest generally between −0.1 and +0.1 radian, with an exception at block 17, where the phase noise may reach about −0.2.

FIG. 12 shows in a graph 900 a phase noise in radian over the channel estimation field CE. On the horizontal axis first block gu and then block gv are depicted. A line 910 shows the phase noise detected when no pre-equalizer and post-equalizer are used. The phase noise may increase from nearly −1.0 radian at the beginning of block gu to about −0.2 at the end of block gv. A line 920 shows the phase noise when a pre-equalizer is used. The phase noise over the whole channel estimation field may stay between −0.1 and +0.1 radian.

With the use of the two phase estimators a device performance loss due to phase noise of only about 0.1 dB may be achieved. With the use of only one of the two equalizers up to 6 dB loss due to phase noise may be detected.

Figure 13:
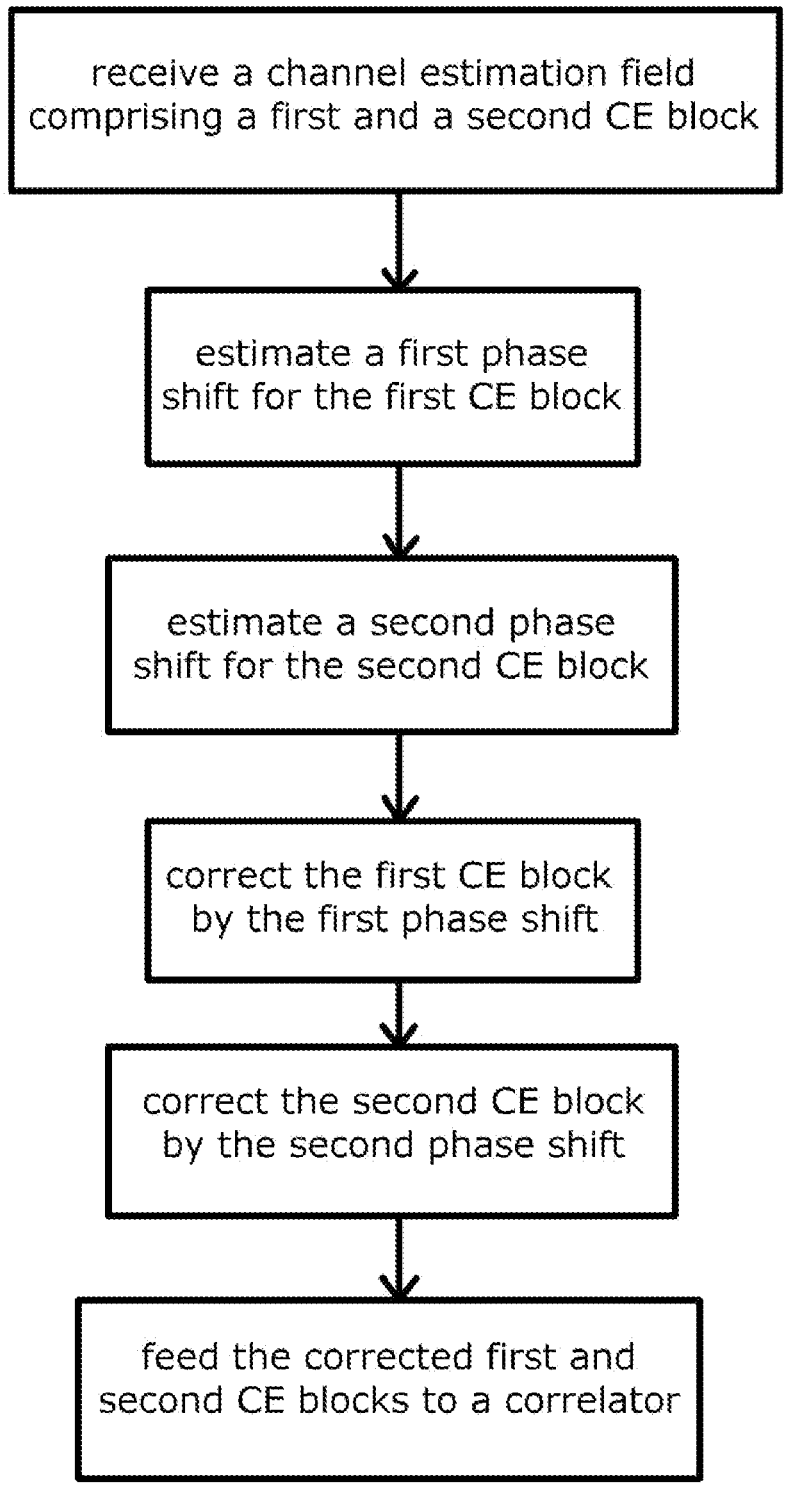
FIG. 13 shows in a flow chart an exemplary example of a method for phase shift correction during estimation of a propagation channel.

An example of a method for estimating a propagation channel is explained with reference to FIG. 13. A channel estimation field comprising a first and a second CE block may be received. A first phase shift may be estimated for the first CE block. The first CE block may be the Gu block. The first CE block may also be only part of the Gu block. A second phase shift for a second CE block may be estimated. Then the first CE block may be corrected, in particular derotated, by the first phase shift and the second CE block may be corrected, in particular derotated, by the second phase shift. The corrected, in particular derotated, first and second CE blocks may be fed to a correlator. It may be an advantage that correcting, in particular derotation, may be effectuated before the correlator. In high frequency systems with e.g. a carrier frequency of 60 GHz, phase noise of the carrier frequency synthesizers may be high. Channel estimation may be hindered by the phase noise because the CE field may be longer than the phase noise correlation time. Therefore, the gu and gv correlators may suffer full phase noise variation, and the estimate may significantly degrade. It may be an advantage of the example that a phase shift for CE blocks may be estimated and the blocks, or even parts of blocks, may be separately corrected, in particular derotated. Phase noise in high frequency systems may vary fast, therefore, short periods for detecting and correcting phase noise may be an advantage.

Figure 14:
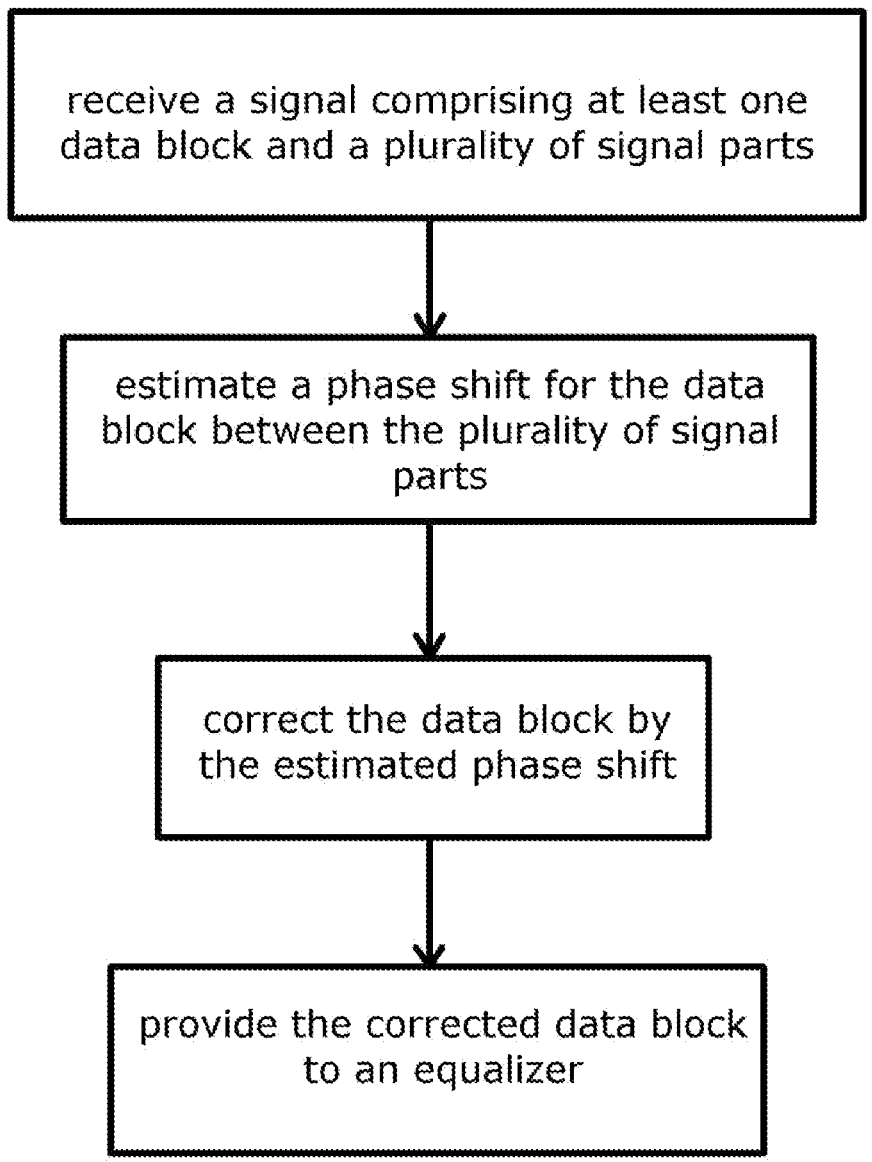
FIG. 14 shows in a flow chart an exemplary example of a method for phase shift correction during demodulation of a signal.

An example of a method for demodulating a signal and more specifically a radio signal is explained with reference to FIG. 14. A device or receiver may receive a signal. The signal may include at least a data block and a plurality of signal parts. A phase estimator may estimate a phase shift for the data block between the plurality of signal parts. The data block may be corrected, in particular derotated, by the estimated phase shift. The corrected, in particular derotated, data block may be fed to an equalizer. In a single carrier system with a data structure including data blocks, demodulation may be effectuated on a whole data block in an equalizer. The demodulation process can be seen as a circular convolution in time domain. With phase noise the cyclic extension of a data block may have a discontinuity between the beginning of the data block and the end of the data block. It may be a stochastic discontinuity and can be important for some data blocks. The circular convolution may transform the discontinuity into a ripple. The ripple may be different from a phase error. A phase error detection and correction effectuated after demodulation may therefore not be effective. It may be an advantage to estimate the phase shift for a data block before demodulating, i.e. before feeding the data block to the equalizer.

EXAMPLES

The following examples pertain to further embodiments.

Example 1 is a device, comprising an input configured to receive a signal. The signal comprises a structure with at least one data block and a plurality of signal parts known to the device, a first signal part at the beginning of the data block and a second signal part at the end of the data block; an equalizer; and a pre-equalizer coupled between the input and the equalizer, wherein the pre-equalizer is configured to estimate a phase shift between the plurality of signal parts.

In Example 2, the subject matter of Example 1 can optionally include that the plurality of signal parts are a signal part out of a guard interval and a signal part of a Golay sequence.

In Example 3, the subject matter of any one of Examples 1-2 can optionally include that the pre-equalizer is further configured to correct a phase of the data block using the estimated phase shift.

In Example 4, the subject matter of any one of Examples 1-3 can optionally include that the pre-equalizer is further configured to correct the signal phase by linear interpolation.

In Example 5, the subject matter of any one of Examples 1-4 can optionally include a tracking unit, wherein the tracking unit is configured to receive the estimated phase shift and to provide a phase tracking to the equalizer.

In Example 6, the subject matter of Example 5 can optionally include that the tracking unit comprises a numerically controlled oscillator and wherein the tracking unit is configured to control the numerically controlled oscillator depending on the estimated phase shift and a frequency offset estimate.

In Example 7, the subject matter of Example 6 can optionally include that the tracking unit is configured to compute a block's common phase error, to compensate for phase error, and is further configured to compute a block's timing error and a phase slope, to compensate for timing error.

In Example 8, the subject matter of any of Examples 5 to 7 can optionally include that the tracking unit is coupled to the equalizer to provide channel estimation values or more specifically channel estimation blocks reference values and equalization coefficients to the equalizer. The channel estimation blocks reference values may be provided to a correlator.

In Example 9, the subject matter of any one of Examples 1-8 can optionally include a post-equalizer coupled to an output of the equalizer, wherein the post-equalizer is configured to estimate a post equalizer phase error of the equalized signal.

In Example 10, the subject matter of Example 9 can optionally include a tracking unit, wherein the tracking unit is configured to receive the estimated phase shift and the estimated post equalizer phase error.

In Example 11, the subject matter of any one of Examples 5-10 can optionally include that the tracking unit is further configured to calculate a time tracking correction.

In Example 12, the subject matter of Example 11 can optionally include that the tracking unit is further configured to receive a frequency offset estimate, which is used for calculating the time tracking correction.

In Example 13, the subject matter of any one of Examples 1-12 can optionally include that the device comprises a single carrier receiver configured to receive a single carrier signal which comprises a channel estimation field comprising two blocks built of Golay sequences, wherein the single carrier signal further comprises a payload comprising data blocks which are separated by guard intervals.

In Example 14, the subject matter of Example 13 can optionally include that a carrier frequency of the single carrier is greater than 40 GHz.

Example 15 is a method for estimating a propagation channel especially of a wireless local area network, the method comprises receiving a channel estimation field comprising a first CE block and a second CE block; estimating a first phase shift for the first CE block and estimating a second phase shift for the second CE block; correcting the first CE block by the first phase shift and correcting the second CE block by the second phase shift; and feeding the corrected first and second CE blocks to an equalizer, more specifically to a correlator.

In Example 16, the subject matter of Example 15 can optionally include that the first phase shift is estimated between two signal parts arranged at the beginning and the end of the first CE block and wherein the second phase shift is estimated between two signal parts arranged at the beginning and at the end of the second CE block.

In Example 17, the subject matter of any of Examples 15-16 can optionally include that for each CE block, M phase shifts are estimated, each for another M-th part of each CE block.

In Example 18, the subject matter of Example 17 can optionally include that the M phase shifts are estimated using a signal part at the separations of the CE block parts.

In Example 19, the subject matter of Example 18 can optionally include that the signal part comprises a Golay sequence.

In Example 20, the subject matter of any of Examples 17-19 can optionally include calculating a reference phase of the first CE block by setting the first phase shift to zero; and calculating a current reference phase of the second CE block by summing the last M/2 phase shifts of the first CE block to the first M/2 phase shifts of the second CE block.

In Example 21, the subject matter of Example 20 can optionally include multiplying the FFT of the first CE block by a reference signal of the first CE block, multiplying the FFT of the second CE block by a reference signal of the second CE block, and summing the two together.

In Example 22, the subject matter of any of Examples 17-21 can optionally include setting a block's common phase error of the first CE block to zero; and calculating a block's common phase error of the second CE block by summing the last M/2 phase shifts of the first CE block to the first M/2 phase shifts of the second CE block.

In Example 23, the subject matter of Example 22 can optionally include multiplying a reference value for the first CE block by a value of FFT of the received first CE block to obtain a first product, multiplying a reference value for the second CE block corrected by block's common phase error of the second block by a value of FFT of the received second CE block to obtain a second product, and summing the two products to obtain a sum.

In Example 24, the subject matter of any of Examples 21-23 can optionally include smoothing the calculated sum to form a channel estimate; and forming an inverse of the channel estimate as an initial equalizer coefficient.

Example 25 is a method of demodulating a signal received over a wireless local area network or wireless personal area network, the method comprises receiving the signal, wherein the signal comprises at least one data block and a plurality of signal parts known to the receiver, a first signal part at the beginning of the data block and a second signal part at the end of the data block; estimating a phase shift for the data block between the plurality of signal parts; correcting the data block by the estimated phase shift; and providing the corrected data block to an equalizer.

In Example 26, the subject matter of Example 25 can optionally include that the equalizer is configured to output an equalized signal and the method further comprises estimating a post equalizer phase error of the equalized signal.

In Example 27, the subject matter of Example 26 can optionally include utilizing the estimated post equalizer phase error and the estimated phase shift for phase tracking in the equalizer.

In Example 28, the subject matter of Example 27 can optionally include utilizing the estimated post equalizer phase error for phase correction in the post equalizer.

In Example 29, the subject matter of Example 28 can optionally include that the post equalizer correction employs calculating phase error over subblocks of the equalized data block.

Example 30 is a device, comprising: a pre-equalizer configured to receive a sampled single carrier signal and configured to estimate a phase shift of the received signal; an equalizer coupled to an output of the pre-equalizer; and a post-equalizer coupled to an output of the equalizer and configured to estimate a post-equalizer phase error of an equalized signal.

In Example 31, the subject matter of Example 30 can optionally include a tracking unit coupled to the pre-equalizer, the equalizer and the post-equalizer, wherein the tracking unit is configured to receive the estimated phase shift and the estimated post equalizer phase error and to provide a phase tracking to the equalizer.

In Example 32, the subject matter of Example 31 can optionally include that the tracking unit comprises a numerically controlled oscillator, wherein the numerically controlled oscillator is controlled depending on the estimated phase shifts and the estimated post equalizer phase errors.

Example 33 is a method for carrier recovery for a single-carrier signal comprising pilot intervals in a Channel Estimation field (CE) and pilot intervals in a Data field, the method comprising: computation of an angle $\Delta\phi[n]$ between a n-th received pilot and a (n+1)-th received pilot; computation of a phase error feed-forward estimate as continuous piecewise-linear function.

In Example 34, the subject matter of Example 33 can optionally include that the phase error feed-forward estimate comprises a linear section starting at a middle of the n-th received pilot, a given time interval between the middle of the n-th received pilot and the middle of the (n+1)-th received pilot, and wherein a slope of the linear section is equal to the angle $\Delta\phi[n]$ divided by the given time interval.

Example 35 is a method for signal demodulation, comprising: per data block, phase shift correction in pre-equalizer with the method of Example 20; updating "block's common phase error" using the phase shifts combined with different weight coefficients; computation of block time shift $T_n$ and T_frac based on the phase shift and a locking ratio of a nominal sampling frequency and a nominal carrier frequency; computation of an oscillator (NCO) vector according to $$\exp\left(j\frac{2\pi f}{N}Tfrac + j\varphi_n\right),$$

f=−N/2 . . . N/2−1; computation of FDE coefficients Equ using "block's common phase error" according to the equation of: Equ=init_Equ·conj(NCO), effectuating Frequency Domain Equalization of the phase-shift-corrected block using the Equ coefficients.

In Example 36, the subject matter of Example 35 can optionally further include a post-equalizer phase correction using computation of angle θ[n] between an equalized GI and an ideal GI-pattern, using angle θ[n] for computing "block's common phase error" for a following block, and using angle θ[n] to correct symbols at an output of equalizer.

In Example 37, the subject matter of Example 36 can optionally further comprise, ahead of time, define several (overlapping) sub-ranges R_1 . . . R_S in a range 0 . . . M−1 where M is the number of symbols in an equalized block, S is a total number of the sub-ranges; regard k-th equalized block to be a sequence of symbols d[n,0] . . . d[n,M−1], where the second index is for a symbol's time offset; regard sub-blocks b[n,1] . . . b[n,S], where b[n,s] comprises symbols d[n,τ] with τϵR_s; ahead of time, compute (for each offset τ) the coefficients c[τ,0], c[τ,1] . . . c[τ,S] which are good for approximation of post equalizer phase error at τ by the linear combination c[τ,0]·θ[n]+c[τ,1]·Φ[n,1]+ . . . +c[τ,S]·Φ[n,S], where θ[n] of Example 29, and for each sub-block b[n,s], Φ[n,s] is the angle of constant rotation having maximal likelihood given the received symbols and assuming strong additive noise;

correct each symbol d[n,τ] by the linear combination c[τ,0]·θ[n]+c[τ,1]·Φ[n,1]+ . . . +c[τ,S]·Φ[n,S].

Example 38 is a method of demodulating a signal including receiving a signal, wherein the signal has a structure comprising at least one data block and a plurality of signal parts known to the receiver, a first signal part at the beginning of the data block and a second signal part at the end of the data block; wherein the signal is equalized, wherein the equalizer is configured to output an equalized signal, wherein the method further includes estimating a phase error of the equalized signal, utilizing the estimated post equalizer phase error for phase correction in the post equalizer, wherein the post equalizer correction employs calculating a phase error over subblocks of the equalized data block, and utilizing these sub-block phase errors to determine phase error of each symbol.

In Example 39, the subject matter of Example 38 can optionally further include that the phase error of each symbol is calculated as a linear combination of the sub-block phase errors.

Example 40 is a computer readable medium on which computer instructions are stored which when executed by a computer, cause the computer to perform any of the methods of the previous Examples.

While the disclosure has been illustrated and described with respect to one or more implementations, alterations and/or modifications may be made to the illustrated examples without departing from the spirit and scope of the appended claims. In particular, with regard to the various functions performed by the above described components or structures, the terms used to describe such components are intended to correspond, unless otherwise indicated, to any component or structure which performs the specified function of the described component (e.g. that is functionally equivalent), even though not structurally equivalent to the disclosed structure which performs the function in the herein illustrated exemplary implementations of the disclosure.

What is claimed is:

1. A device, comprising:
an input configured to receive a signal, wherein the signal comprises a structure comprising at least one data block and a plurality of signal parts known to the device, a first signal part at the beginning of the data block and a second signal part at the end of the data block;
an equalizer;
a pre-equalizer coupled between the input and the equalizer, wherein the pre-equalizer is configured to estimate a phase shift between the plurality of signal parts; and
a tracking circuit configured to:
receive the estimated phase shift and a frequency offset estimate,
generate a phase tracking based on the estimated phase shift and the frequency offset estimate, and
provide the generated phase tracking to the equalizer.

2. The device of claim 1, wherein the plurality of signal parts are a signal part out of a guard interval and a signal part of a Golay sequence.

3. The device of claim 1, wherein the pre-equalizer is further configured to correct a phase of the data block using the estimated phase shift.

4. The device of claim 3, wherein the pre-equalizer is further configured to correct the signal phase by linear interpolation.

5. The device of claim 1, wherein the tracking circuit comprises: a numerically controlled oscillator, wherein the tracking circuit is further configured to control the numerically controlled oscillator depending on the estimated phase shift and a frequency offset estimate.

6. The device of claim 5, wherein the tracking circuit is configured to compute a block's common phase error to compensate for phase error, and compute a block's timing error and a phase slope to compensate for timing error.

7. The device of claim 5, wherein the tracking circuit is coupled to the equalizer to provide channel estimation blocks reference values to a correlator and equalization coefficients to the equalizer.

8. The device of claim 1, further comprising a post-equalizer coupled to an output of the equalizer, wherein the post-equalizer is configured to estimate a phase error of the equalized signal.

9. The device of claim 8, wherein the tracking circuit is configured to receive the estimated post equalizer phase error.

10. The device of claim 9, wherein the tracking circuit is further configured to calculate a time tracking correction.

11. The device of claim 10, wherein the tracking circuit is further configured to receive a frequency offset estimate, wherein the tracking circuit is configured to calculate the time tracking correction based on the frequency offset estimate.

12. The device of claim 1, wherein the device comprises a single carrier receiver configured to receive a single carrier signal which comprises a channel estimation field comprising two blocks built of Golay sequences, wherein the single carrier signal further comprises a payload comprising data blocks which are separated by guard intervals.

13. The device of claim 1, wherein the tracking circuit is further configured to:
receive a phase error of an equalized signal equalized by the equalizer; and generate the phase tracking based on the frequency offset estimate, the estimated phase shift, and the phase error.

14. A method of demodulating a signal received over a wireless local area network, the method comprising:

receiving the signal, wherein the signal comprises a structure comprising at least one data block and a plurality of signal parts known to the receiver, a first signal part at the beginning of the data block and a second signal part at the end of the data block;

estimating a phase shift for the data block between the plurality of signal parts;

generating phase tracking based on a received frequency offset estimate and the estimated phase shift;

correcting the data block by the estimated phase shift; and providing the corrected data block and the phase tracking to an equalizer.

15. The method of claim 14, wherein the equalizer is configured to output an equalized signal and the method further comprises estimating a post equalizer phase error of the equalized signal.

16. The method of claim 15, further comprising:

utilizing the estimated post equalizer phase error, the frequency offset estimate, and the estimated phase shift for phase tracking in the equalizer.

17. A method of demodulating a signal, the method comprising:

receiving a signal, wherein the signal has a structure comprising a data block and a plurality of signal parts known to the receiver, a first signal part at the beginning of the data block and a second signal part at the end of the data block;

estimating a phase shift for the data block;

generating phase tracking based on a received frequency offset estimate and the estimated phase shift;

equalizing, using an equalizer, the signal based on the phase tracking to generate an equalized signal;

estimating a phase error of the equalized signal; and utilizing the estimated phase error of the equalized signal for phase correction in the post equalizer, wherein a post equalizer phase correction includes calculating a phase error over subblocks of the equalized data block, and utilizing the respective phase errors of the sub-blocks to determine phase error of each symbol.

18. The method of claim 17, wherein the phase error of each symbol is calculated as a linear combination of the sub-block phase errors.

* * * * *